United States Patent
Arndt et al.

(10) Patent No.: US 7,685,335 B2
(45) Date of Patent: Mar. 23, 2010

(54) VIRTUALIZED FIBRE CHANNEL ADAPTER FOR A MULTI-PROCESSOR DATA PROCESSING SYSTEM

(75) Inventors: Richard Louis Arndt, Austin, TX (US); Patrick Allen Buckland, Austin, TX (US); Harvey Gene Kiel, Rochester, MN (US); Renato John Recio, Austin, TX (US); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 11/065,869

(22) Filed: Feb. 25, 2005

(65) Prior Publication Data

US 2006/0209863 A1    Sep. 21, 2006

(51) Int. Cl.
| | |
|---|---|
| G06F 3/00 | (2006.01) |
| G06F 13/28 | (2006.01) |
| G06F 5/00 | (2006.01) |
| G06F 13/12 | (2006.01) |
| G06F 13/38 | (2006.01) |
| G06F 13/00 | (2006.01) |
| H04L 12/28 | (2006.01) |

(52) U.S. Cl. .............................. 710/56; 710/5; 710/12; 710/28; 710/36; 710/37; 710/39; 710/52; 710/62; 710/100; 710/311; 370/412

(58) Field of Classification Search ........................ None
See application file for complete search history.

(56) References Cited

U.S. PATENT DOCUMENTS

| | | | |
|---|---|---|---|
| 6,111,894 A | 8/2000 | Bender et al. | |
| 6,134,641 A | 10/2000 | Anand | |
| 6,279,046 B1 * | 8/2001 | Armstrong et al. | ............. 710/5 |

(Continued)

FOREIGN PATENT DOCUMENTS

EP    1508855 A2    8/2004

OTHER PUBLICATIONS

U.S. Appl. No. 11/066,424, filed Feb. 25, 2005, Arndt et al.

(Continued)

*Primary Examiner*—Tariq R. Hafiz
*Assistant Examiner*—Henry Yu
(74) *Attorney, Agent, or Firm*—Yee & Associates, P.C.; Diana R. Gerhardt

(57) ABSTRACT

An enhanced fibre channel adapter with multiple queues for use by different server processors or partitions. For a non-partitioned server, the OS owns the adapter, controls the adapter queues, and updates the queue table(s). An OS operator can obtain information from the fibre channel network about the fibre channel storage data zones available to the physical fibre channel adapter port and can specify that one or more zones can be accessed by a specific processor or group of processors. The processor or group of processors is given an adapter queue to access the zone or zones of storage data. This queue is given a new World Wide Port Name or new N-Port ID Virtualization identifier, to differentiate this queue from another queue that might have access to a different storage data zone or zones. For a partitioned server, one partition owns the adapter, controls the adapter queues, and updates the queue table(s). The partition management tool can obtain information from the fibre channel network about the fibre channel storage data zones available. A system operator can assign one or more storage zones under a fibre channel storage adapter to a partition. Each partition that has access to a zone or zones under an adapter is given an adapter queue to access the zone or zones. This queue is given a new World Wide Port Name or new N-Port ID Virtualization identifier, to differentiate this queue from another queue that might have access to a different storage data zone or zones.

8 Claims, 23 Drawing Sheets

U.S. PATENT DOCUMENTS

| | | | |
|---|---|---|---|
| 6,401,149 B1* | 6/2002 | Dennin et al. | 710/58 |
| 6,453,392 B1 | 9/2002 | Flynn, Jr. | |
| 6,629,157 B1 | 9/2003 | Falardeau et al. | |
| 6,629,162 B1 | 9/2003 | Arndt et al. | |
| 6,662,289 B1 | 12/2003 | Ang | |
| 6,665,759 B2 | 12/2003 | Dawkins et al. | |
| 6,704,284 B1 | 3/2004 | Stevenson et al. | |
| 6,738,854 B2* | 5/2004 | Hoese et al. | 710/315 |
| 6,804,741 B2 | 10/2004 | Cowan | |
| 6,823,418 B2 | 11/2004 | Langendorf et al. | |
| 6,880,021 B2 | 4/2005 | Easton et al. | |
| 6,973,510 B2 | 12/2005 | Arndt et al. | |
| 7,080,291 B2 | 7/2006 | Moriki et al. | |
| 7,215,680 B2* | 5/2007 | Mullendore et al. | 370/412 |
| 2002/0069335 A1 | 6/2002 | Flynn, Jr. | |
| 2002/0085493 A1 | 7/2002 | Pekkala et al. | |
| 2002/0112102 A1 | 8/2002 | Tarui et al. | |
| 2002/0129172 A1 | 9/2002 | Baskey et al. | |
| 2002/0129212 A1 | 9/2002 | Lee et al. | |
| 2003/0014738 A1 | 1/2003 | Dawkins et al. | |
| 2003/0061379 A1 | 3/2003 | Craddock et al. | |
| 2003/0067930 A1* | 4/2003 | Salapura et al. | 370/412 |
| 2003/0091062 A1* | 5/2003 | Lay et al. | 370/463 |
| 2003/0110205 A1 | 6/2003 | Johnson | |
| 2003/0204648 A1 | 10/2003 | Arndt | |
| 2003/0236852 A1* | 12/2003 | Fernandes et al. | 709/215 |
| 2004/0202189 A1 | 10/2004 | Arndt et al. | |
| 2004/0215848 A1* | 10/2004 | Craddock et al. | 710/39 |
| 2005/0076157 A1 | 4/2005 | Serizawa et al. | |
| 2005/0091365 A1 | 4/2005 | Lowell et al. | |
| 2005/0097384 A1 | 5/2005 | Uehara et al. | |
| 2005/0102682 A1* | 5/2005 | Shah et al. | 719/321 |
| 2005/0119996 A1 | 6/2005 | Ohata et al. | |
| 2005/0120160 A1 | 6/2005 | Plouffe et al. | |
| 2005/0172041 A1* | 8/2005 | Pettey | 710/1 |
| 2005/0182788 A1 | 8/2005 | Arndt et al. | |
| 2005/0240932 A1 | 10/2005 | Billau et al. | |
| 2005/0246450 A1 | 11/2005 | Enko et al. | |
| 2005/0281282 A1* | 12/2005 | Gonzalez et al. | 370/422 |
| 2006/0044301 A1 | 3/2006 | Ha | |
| 2006/0069828 A1 | 3/2006 | Goldsmith | |
| 2006/0112376 A1 | 5/2006 | Broberg et al. | |
| 2006/0143334 A1* | 6/2006 | Naik | 710/56 |
| 2006/0184349 A1 | 8/2006 | Goud et al. | |
| 2006/0239287 A1 | 10/2006 | Johnsen et al. | |
| 2006/0242330 A1 | 10/2006 | Torudbakken et al. | |
| 2006/0242332 A1 | 10/2006 | Johnsen et al. | |
| 2006/0242333 A1 | 10/2006 | Johnsen et al. | |
| 2006/0242352 A1 | 10/2006 | Torudbakken et al. | |
| 2006/0242354 A1 | 10/2006 | Johnsen et al. | |
| 2006/0253619 A1 | 11/2006 | Torudbakken et al. | |

OTHER PUBLICATIONS

U.S. Appl. No. 11/066,645, filed Feb. 25, 2005, Arndt et al.
U.S. Appl. No. 11/065,951, filed Feb. 25, 2005, Arndt et al.
U.S. Appl. No. 11/066,201, filed Feb. 25, 2005, Arndt et al.
U.S. Appl. No. 11/065,818, filed Feb. 25, 2005, Arndt et al.
U.S. Appl. No. 11/066,518, filed Feb. 25, 2005, Arndt et al.
U.S. Appl. No. 11/066,096, filed Feb. 25, 2005, Arndt et al.
U.S. Appl. No. 11/066,419, filed Feb. 25, 2005, Arndt et al.
U.S. Appl. No. 11/066,931, filed Feb. 25, 2005, Arndt et al.
U.S. Appl. No. 11/068,664, filed Feb. 28, 2005, Arndt et al.
U.S. Appl. No. 11/066,353, filed Feb. 25, 2005, Arndt et al.
U.S. Appl. No. 11/065,830, filed Feb. 25, 2005, Arndt et al.
U.S. Appl. No. 11/065,829, filed Feb. 25, 2005, Arndt et al.
U.S. Appl. No. 11/066,517, filed Feb. 25, 2005, Arndt et al.
U.S. Appl. No. 11/065,821, filed Feb. 25, 2005, Arndt et al.
U.S. Appl. No. 11/066,487, filed Feb. 25, 2005, Arndt et al.
U.S. Appl. No. 11/066,519, filed Feb. 25, 2005, Arndt et al.
U.S. Appl. No. 11/066,521, filed Feb. 25, 2005, Arndt et al.
U.S. Appl. No. 11/067,354, filed Feb. 25, 2005, Arndt et al.
U.S. Appl. No. 11/066,590, filed Feb. 25, 2005, Arndt et al.
U.S. Appl. No. 11/065,823, filed Feb. 25, 2005, Arndt et al.
Jann et al., "Dynamic Reconfiguration: Basic Building Blocks for Autonomic Computing on IBM PSeries Servers," IBM System Journal, vol. 42, Jan. 2003 pp. 29-37.
"Logical Partition Security in the IBM @server pSeries 690", IBM, 2002, pp. 1-13.
Hensbergen, "The Effect of Virtualization on OS Interference", IBM Research, Proceedings of 1st workshop on Operating Systems Inteference in High Performance Applications, Aug. 2005, p. 1-6.
"Virtual Interface Architecture Specification", Version 1.0, Dec. 1997, pp. 11-12, 20-22, 55-57, 64-66, retrieved Apr. 19, 2006. http://rimonbarr.com/repository/cs614/san_10.pdf.

* cited by examiner

VIRTUALIZED FIBRE CHANNEL ADAPTER FOR A MULTI-PROCESSOR DATA PROCESSING SYSTEM

CROSS-REFERENCE TO RELATED APPLICATIONS

This application is related to commonly assigned and co-pending U.S. patent application Ser. No. 11/066,424 entitled "Method, System and Program Product for Differentiating Between Virtual Hosts on Bus Transactions and Associating Allowable Memory Access for an Input/Output Adapter that Supports Virtualization"; U.S. patent application Ser. No. 11/066,645 entitled "Virtualized I/O Adapter for a Multi-Processor Data Processing System"; U.S. patent application Ser. No. 11/065,951 entitled "Interrupt Mechanism on an IO Adapter That Supports Virtualization"; U.S. patent application Ser. No. 11/066,201 entitled "System and Method for Modification of Virtual Adapter Resources in a Logically Partitioned Data Processing System"; U.S. patent application Ser. No. 11/065,818 entitled "Method, System, and Computer Program Product for Virtual Adapter Destruction on a Physical Adapter that Supports Virtual Adapters"; U.S. patent application Ser. No. 11/066,518 entitled "System and Method of Virtual Resource Modification on a Physical Adapter that Supports Virtual Resources"; U.S. patent application Ser. No. 11/066,096 entitled "System and Method for Destroying Virtual Resources in a Logically Partitioned Data Processing System"; U.S. patent application Ser. No. 11/066,419 entitled "Association of Memory Access Through Protection Attributes that are Associated to an Access Control Level on a PCI Adapter that Supports Virtualization"; U.S. patent application Ser. No. 11/066,931 entitled "Association of Host Translations that are Associated to an Access Control Level on a PCI Bridge that Supports Virtualization"; U.S. patent application Ser. No. 11/065,823 entitled "Method, Apparatus, and Computer Program Product for Coordinating Error Reporting and Reset Utilizing an I/O Adapter that Supports Virtualization"; U.S. patent application Ser. No. 11/068,664 entitled "Method and System for Fully Trusted Adapter Validation of Addresses Referenced in a Virtual Host Transfer Request"; U.S. patent application Ser. No. 11/066,353 entitled "System, Method, and Computer Program Product for a Fully Trusted Adapter Validation of Incoming Memory Mapped I/O Operations on a Physical Adapter that Supports Virtual Adapters or Virtual Resources"; U.S. patent application Ser. No. 11/065,830 entitled "System and Method for Host Initialization for an Adapter that Supports Virtualization"; U.S. patent application Ser. No. 11/065,829 entitled "Data Processing System, Method, and Computer Program Product for Creation and Initialization of a Virtual Adapter on a Physical Adapter that Supports Virtual Adapter Level Virtualization"; U.S. patent application Ser. No. 11/066,517 entitled "System and Method for Virtual Resource Initialization on a Physical Adapter that Supports Virtual Resources"; U.S. patent application Ser. No. 11/065,821 entitled "Method and System for Native Virtualization on a Partially Trusted Adapter Using Adapter Bus, Device and Function Number for Identification"; U.S. patent application Ser. No. 11/066,487 entitled "Native Virtualization on a Partially Trusted Adapter Using PCI Host Memory Mapped Input/Output Memory Address for Identification"; U.S. patent application Ser. No. 11/066,519 entitled "Native Virtualization on a Partially Trusted Adapter Using PCI Host Bus, Device, and Function Number for Identification"; U.S. patent application Ser. No. 11/066,521 entitled "System and Method for Virtual Adapter Resource Allocation"; U.S. patent application Ser. No. 11/067,354 entitled "System and Method for Providing Quality of Service in a Virtual Adapter"; and U.S. patent application Ser. No. 11/066,590 entitled "System and Method for Managing Metrics Table Per Virtual Port in a Logically Partitioned Data Processing System" all of which are hereby incorporated by reference.

FIELD OF THE INVENTION

The present invention relates to multi-processor data processing systems, and more particularly relates to a virtualized input/output adapter for use by such multi-processor data processing system. Still more particularly, the present invention relates to a storage input/output adapter having a plurality of queues for use by a plurality of processors in a multi-processor data processing system.

BACKGROUND OF THE INVENTION

In data processing systems having a plurality of processors, also known as a multi-processor data processing system, there can be two different types of servers—non-partitioned servers and partitioned servers.

A non-partitioned server is one that has a single operating system (OS) instance running on the server, with multiple threads running within that OS instance (e.g. one thread per processor).

A logically partitioned server is one where a hypervisor manages multiple partitions, with one OS instance running in each partition, where each partition has allocated resources such as processor(s) (a single processor, multiple processors, or a portion of a processor), memory and input/output (I/O) adapters. Logically partitioned servers typically have a partition management tool function. The partition management tool can be used to configure the number of partitions on the server, the OS type to run in each partition, the processor and memory resources assigned to each partition, and each I/O adapter assigned to a partition. For example, the partition management tool can run in an external PC, rack-mounted PC, server service processor, in a partition on the server, or managed across a network by a PC or server.

One type of bus used to connect I/O devices to a data processing system is known as a Peripheral Computer Interface (PCI) bus, where I/O devices typically connect to an I/O adapter connected to an internal PCI bus within a data processing system. PCI bus speeds continue to increase in their speed of transferring data and control signals to/from I/O devices and processors within the data processing system. In addition, storage devices are operating at faster speeds and the number of processors used in a multi-processor data processing system is also increasing. However, existing I/O adapters such as SCSI or fibre channel adapters are not designed to fully take advantage of servers having multiple processors. For example, they are not designed to allow different processors to efficiently read and write to different SCSI storage devices or fibre channel zoned storage data under a single adapter such as a SCSI or fibre channel adapter.

SCSI adapters are used to couple SCSI-compliant storage devices to a PCI bus for access by processors within the data processing system. SCSI storage devices include individual hard disks, mirrored hard disk pairs, RAID arrays formed by logically grouping multiple hard disks into a RAID array, tape, and optical devices.

Similarly, fibre channel adapters are used to couple fibre channel network attached storage data to a PCI bus for access by processors within the data processing system. Fibre channel adapters are used to access storage data through a fibre channel network, for example, switches, routers, and hubs. Fibre channel storage subsystem data is typically zoned, where each zone can be accessed by one or more entities across the fibre channel network. Each zone typically has a list of World Wide Port Names associated with the zone (World Wide Port Names apply to server ports accessing storage data and to ports in the fibre channel storage subsystem). Fibre channel storage data is typically stored on hard disks in a fibre channel storage subsystem.

Today's multi-processor data processing system servers have bottlenecks that can significantly degrade throughput from what the adapter and storage devices are capable of, add undesired latencies, and increase CPU utilization required to allow sharing of an adapter. Part of this problem can be attributable to the fact that existing internal I/O storage adapters effectively have a single queue for the server processors to use.

In a non-partitioned multi-processor server, the processors (executing threads doing reads and writes) are not efficient/responsive to sending commands and processing responses. For example, a single interrupt indicates good path responses, even though different processors issued commands.

In a logically partitioned server, a hosting partition may own a storage adapter and allow one or more hosted partitions to access storage data through the hosting partition. The hosting partition is involved in all reads and writes, increasing overall server processor utilization and latencies, as the single queue and adapter interrupts are solely managed by the hosting partition.

There is thus a need to provide an improved multi-processor data processing system including enhanced I/O storage adapters with capabilities for efficiently sharing I/O adapters and devices between processors of a multi-processor data processing system.

SUMMARY OF THE INVENTION

The present invention is directed to an enhanced fibre channel adapter with multiple queues for use by different server processors or partitions.

For a non-partitioned server, the OS owns the fibre channel adapter, controls the adapter queues, both creation of and changes to the queues, and updates the queue table(s) in the storage adapter with queue address information, message signaled interrupt (MSI) information and optional queue priorities. An OS operator can obtain information from the fibre channel network about the fibre channel storage data zones available to the physical fibre channel adapter port and can specify that one or more zones can be accessed by a specific processor or group of processors. The processor or group of processors is given an adapter queue to access the zone or zones of storage data. This queue is given a new World Wide Port Name or a new N-Port ID Virtualization identifier, to differentiate this queue from another queue that might have access to a different storage data zone or zones. A new type of OS adapter driver manages queues for a multi-queue fibre channel adapter.

For a partitioned server, one partition, which may be a hosting partition, owns the fibre channel adapter, controls the adapter queues, both creation of and changes to the queues, and updates the queue table(s) in the storage adapter with queue address information, message signaled interrupt (MSI) information and optional queue priorities. The partition management tool can obtain information from the fibre channel network about the fibre channel storage data zones available. A system operator can use the partition management tool to view the partitions on the server, the fibre channel storage adapters on the server, storage zones available under each fibre channel adapter (note: servers frequently have redundant fibre channel adapters and network paths to a fibre channel storage subsystem; the redundant paths should ideally be understood by the partition management tool to provide complete storage network configuration information). The system operator can assign one or more storage zones under a fibre channel storage adapter to a partition, which may be a hosted partition. Each partition that has access to a zone or zones under an adapter is given an adapter queue to access the zone or zones. This queue is given a new World Wide Port Name or a new N-Port ID Virtualization identifier, to differentiate this queue from another queue that might have access to a different storage data zone or zones. A new type of OS adapter driver manages queues for a multi-queue fibre channel adapter.

In a partitioned server environment, the hosting/owning partition is involved in initialization, configuration and adapter errors that affect the entire adapter. Errors specific to one queue are sent to the hosted partition that owns the queue. If the hosted partition can recover from the error (for example, by a retry or reset of its queue), there is no need for further involvement by the hosting/owning partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating the key elements of the parallel Peripheral Computer Interface (PCI) bus protocol in accordance with a preferred embodiment of the present;

DETAILED DESCRIPTION OF THE PREFERRED EMBODIMENT

The present invention applies to any general or special purpose host that uses PCI family I/O adapter to directly attach storage or to attach to a network, where the network consists of endnodes, switches, router and the links interconnecting these components. The network links can be Fibre Channel, Ethernet, InfiniBand, Advanced Switching Interconnect, or a proprietary link that uses proprietary or standard protocols.

Figure 1:
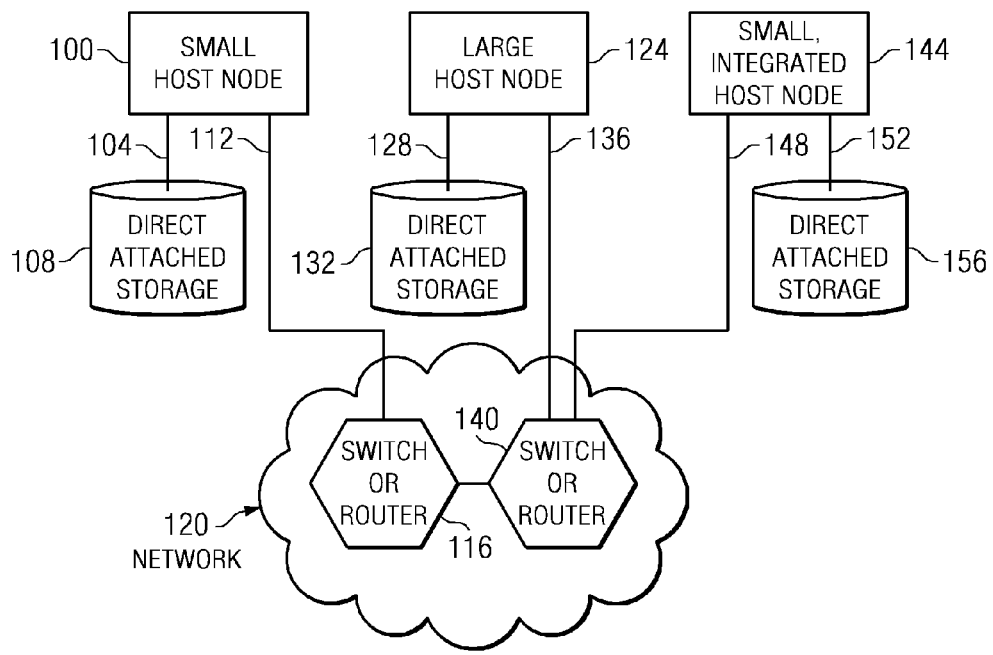
FIG. 1 is a diagram of a distributed computer system illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a network, such as Network 120 and is provided merely for illustrative purposes and the embodiments of the present invention described below can be implemented on computer systems of numerous other types and configurations. Two switches (or routers) are shown inside of Network 120, Switch 116 and Switch 140. Switch 116 connects to a small host node, such as Small Host Node 100 through a port, such as Port 112. Small Host Node 100 also contains a second type of port, Port 104, which connects to a direct attached storage subsystem, such as Direct Attached Storage 108.

Network 120 can also attach a large host node, such as Large Host Node 124, which is connected to Network 120, through Port 136 which attaches to Switch 140. Large Host Node 124 can also contain a second type of port, such as port 128, which connects to a direct attached storage subsystem, such as Direct Attached Storage 132.

Network 120 can also attach a small integrated host node, such as Small Integrated Host Node 144, which is connected to Network 120, through Port 148 which attaches to Switch 140. Small Integrated Host Node 144 can also contain a second type of port, such as Port 152, which connects to a direct attached storage subsystem, such as Direct Attached Storage 156.

Figure 2:
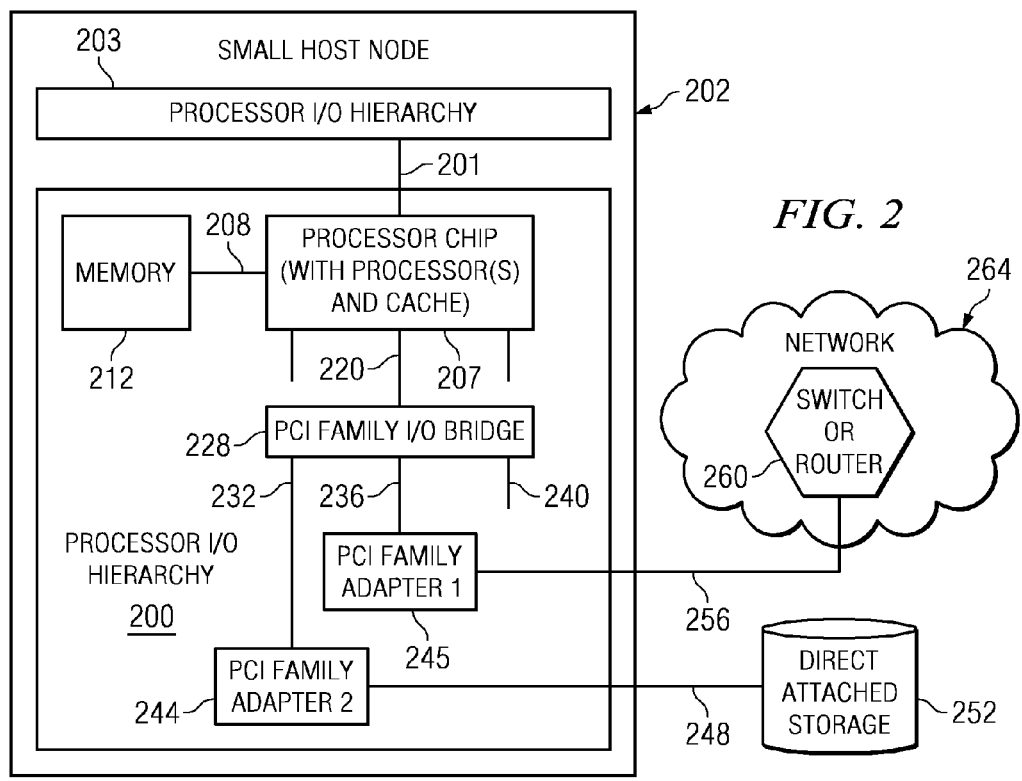
FIG. 2 is a functional block diagram of a small host processor node in accordance with a preferred embodiment of the present invention.

Turning next to FIG. 2, a functional block diagram of a small host node is depicted in accordance with a preferred embodiment of the present invention. Small Host Node 202 is an example of a host processor node, such as Small Host Node 100 in FIG. 1.

In this example, Small Host Node 202, shown in FIG. 2, includes two processor I/O hierarchies, such as Processor I/O Hierarchy 200 and 203, which are interconnected through Link 201. In FIG. 2, Processor I/O Hierarchy 200 is drawn completely and includes a processor chip, such as Processor Chip 207, which includes one or more processors and their associated caches. Processor Chip 207 is connected to memory, such as Memory 212, through a link, such as Link 208. One of the links on the processor chip, such as Link 220, connects to a PCI family I/O bridge, such as PCI Family I/O Bridge 228. The PCI Family I/O Bridge 228 has one or more PCI family (PCI, PCI-X, PCI-Express, or any future generation of PCI) links that is used to connect other PCI family I/O bridges or a PCI family I/O adapter, such as PCI Family Adapter 1 245 and PCI Family Adapter 2 244 through a PCI link, such as Link 232, 236, and 240. PCI Family Adapter 1 245 can also be used to connect a network, such as Network 264, through a link, such as Link 256, either a switch or router, such as Switch or Router 260. PCI Family Adapter 2 244 can be used to connect direct attached storage, such as Direct Attached Storage 252, through a link, such as Link 248.

Figure 3:
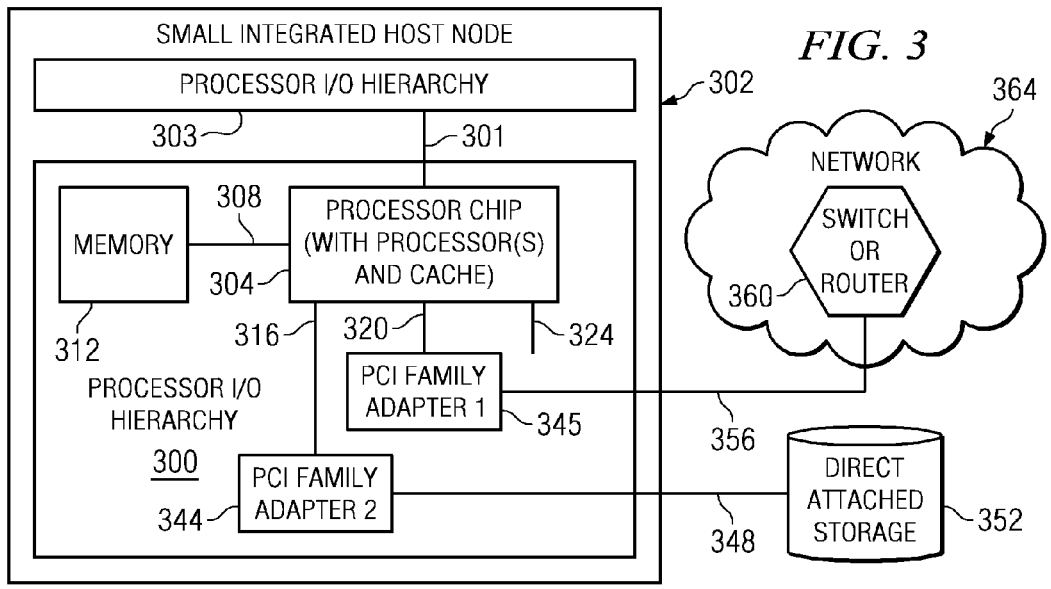
FIG. 3 is a functional block diagram of a small, integrated host processor node in accordance with a preferred embodiment of the present invention.

With reference now to FIG. 3, a functional block diagram of a small integrated host node is depicted in accordance with a preferred embodiment of the present invention. Small Integrated Host Node 302 is an example of a host processor node, such as Small Integrated Host Node 144 in FIG. 1.

In this example, Small Integrated Host Node 302, shown in FIG. 3, includes two processor I/O hierarchies, such as Processor I/O Hierarchy 300 and 303, which are interconnected through Link 301. In FIG. 3 Processor I/O Hierarchy 300 is drawn completely, it includes a processor chip, such as Processor Chip 304, which includes one or more processors and their associated caches. Processor Chip 304 is connected to memory, such as Memory 312, through a link, such as Link 308. One of the links on the Processor Chip 304, such as Link 316, connects to a PCI family adapter, such as PCI Family Adapter 344. The Processor Chip 304 has one or more PCI family (PCI, PCI-X, PCI-Express, or any future generation of PCI) links that is used to connect either PCI family I/O bridges or a PCI family I/O adapter, such as PCI Family Adapter 345 and PCI Family Adapter 2 344 through a PCI link, such as Link 316, 320, and 324. PCI Family Adapter 1 345 can also be used to connect a network, such as Network 364, through a link, such as Link 356, either a switch or router, such as Switch or Router 360. PCI Family Adapter 2 344 can be used to connect direct attached storage, such as Direct Attached Storage 352, through a link, such as Link 348.

Figure 4:
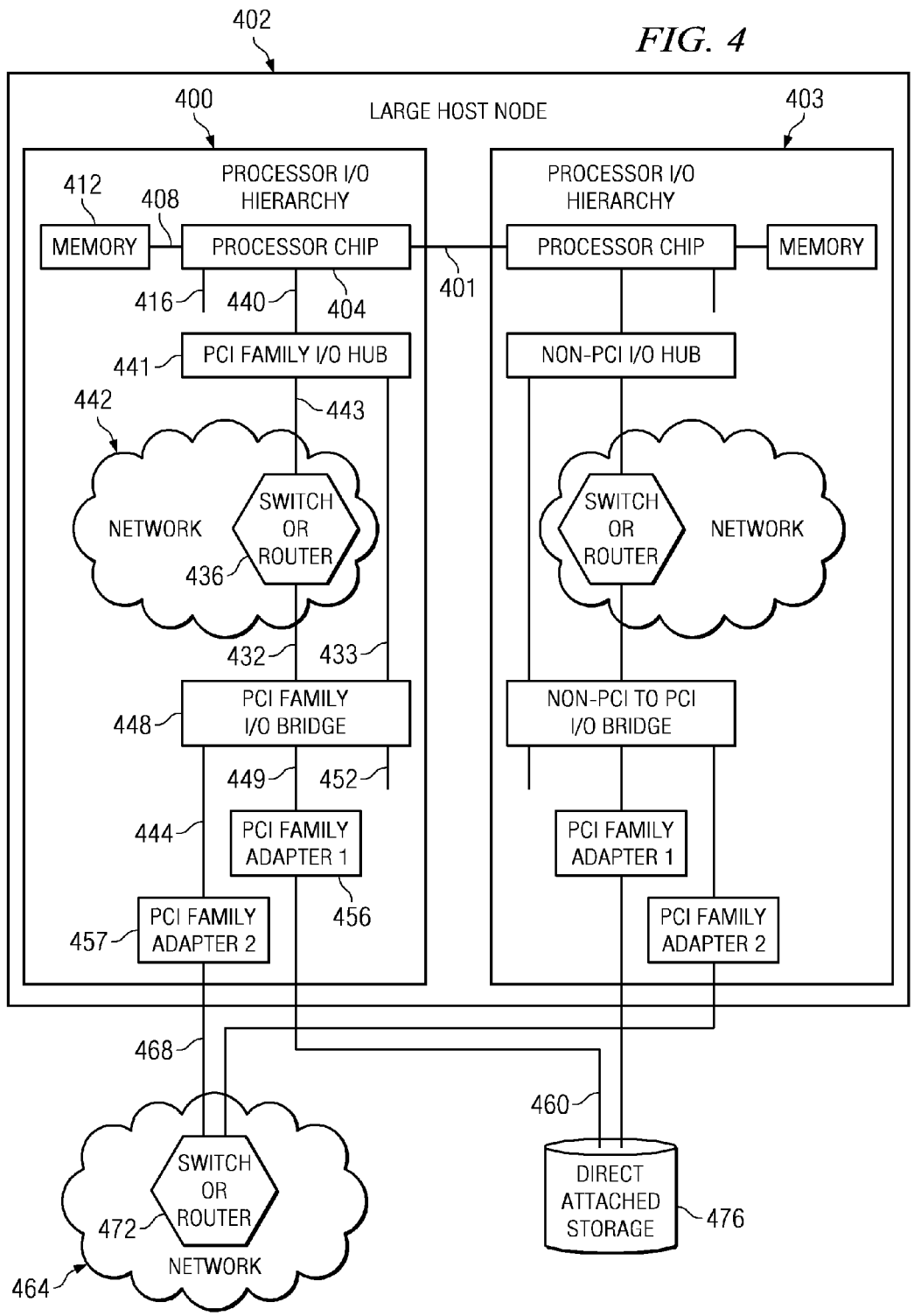
FIG. 4 is a functional block diagram of a large host processor node in accordance with a preferred embodiment of the present invention.

Turning now to FIG. 4, a functional block diagram of a large host node is depicted in accordance with a preferred embodiment of the present invention. Large Host Node 402 is an example of a host processor node, such as Large Host Node 124 in FIG. 1.

In this example, Large Host Node 402, shown in FIG. 4, includes two processor I/O hierarchies, such as Processor I/O Hierarchies 400 and 403, which are interconnected through Link 401. In FIG. 4 Processor I/O Hierarchy 400 includes a processor chip, such as Processor Chip 404, which includes one or more processors and their associated caches. Processor Chip 404 is connected to memory, such as Memory 412, through a link, such as Link 408. One of the links on Processor Chip 404, such as Link 440, connects to a PCI family I/O hub, such as PCI Family I/O Hub 441. PCI Family I/O Hub 441 uses a network, such as Network 442, to attach to a PCI family I/O bridge, such as PCI Family I/O Bridge 448. That is, PCI Family I/O Bridge 448 is connected to Switch or Router 436 through Link 432 and Switch or Router 436 also attaches to PCI Family I/O Hub 441 through Link 443. Network 442 allows the PCI family I/O hub and PCI family I/O bridge to be placed in different packages. PCI Family I/O Bridge 448 has one or more PCI family (PCI, PCI-X, PCI-Express, or any future generation of PCI) links that is used to connect other PCI family I/O bridges or a PCI family I/O adapter, such as PCI Family Adapter 1 456 and PCI Family Adapter 2 457 through a PCI link, such as Link 444, 449, and 452. PCI Family Adapter 1 456 can be used to connect a direct attached storage, such as Direct Attached Storage 476, through a link, such as Link 460. PCI Family Adapter 2 457 also can be used to connect a network, such as Network 464, through a link, such as 468, either a switch or router, such as Switch or Router 472.

Turning next to FIG. 5, an illustration of the phases contained in a conventional PCI bus transaction, such as PCI 500, and a PCI-X bus transaction, such as PCI-X 520 is depicted in accordance with a preferred embodiment of the present invention. PCI 500 depicts a conventional PCI bus transaction that forms the unit of information which is transferred through a PCI fabric for conventional PCI. PCI-X 520 depicts a PCI-X bus transaction that forms the unit of information which is transferred through a PCI fabric for PCI-X.

PCI 500 shows three phases: an address phase, such as Address Phase 508; a data phase, such as Data Phase 512; and a turnaround cycle, such as Turnaround Cycle 516. Also depicted is the Arbitration for next transfer, 504, which can occur simultaneously with the three phases. For conventional PCI, the address contained in the address phase is used to route a bus transaction from the adapter to the host and from the host to the adapter.

PCI-X 520 shows five phases: an address phase, such as Address Phase 528; an attribute phase, such as Attribute Phase 532; a response phase, such as Response Phase 560; a data phase, such as Data Phase 564; and a turnaround cycle, such as Turnaround Cycle 566. Also depicted is the Arbitration for next transfer 524, which can occur simultaneously with the three phases. Similar to conventional PCI, PCI-X uses the address contained in the address phase to route a bus transaction from the adapter to the host and from the host to the adapter. However, PCI-X adds Attribute Phase 532, which contains three fields that define the bus transaction requester, these three fields are the: Requestor Bus Number 544, Requestor Device Number 548, and Requestor Function Number 552. The bus transaction also contains a Tag 540, which uniquely identifies the specific bus transaction in relation to other bus transactions that are outstanding between the requester and the responder. Byte Count 556 contains a count of the number of bytes being sent.

Figure 6:
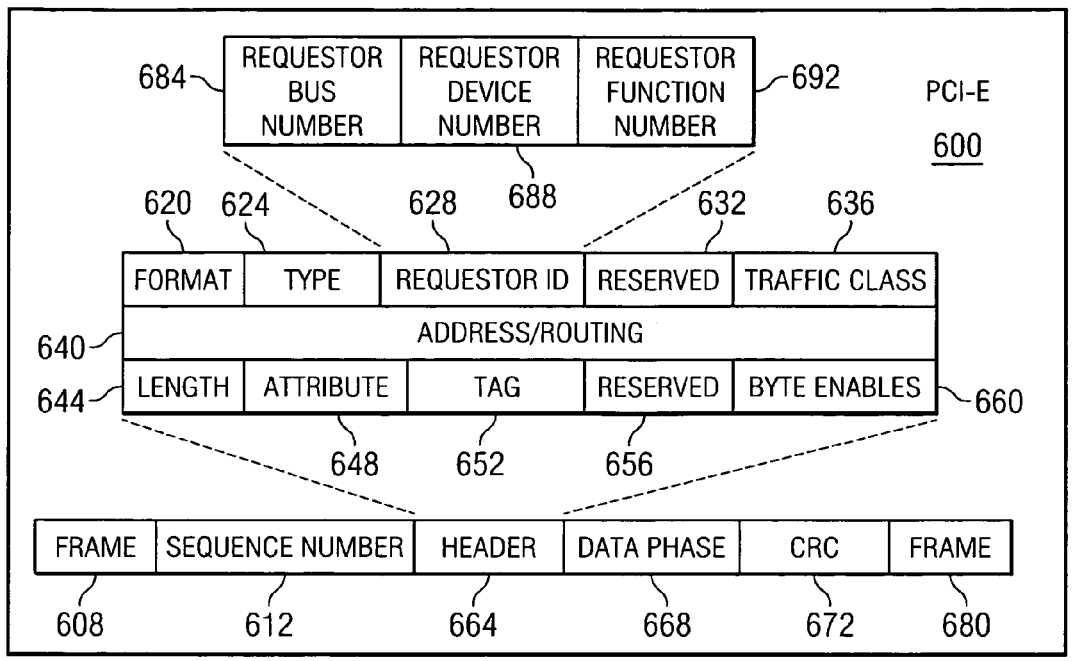
FIG. 6 is a diagram illustrating the key elements of the serial PCI bus protocol in accordance with a preferred embodiment of the present.

Turning now to FIG. 6, an illustration of the phases contained in a PCI-Express bus transaction, such as PCI-E bus transaction 600 is depicted in accordance with a preferred embodiment of the present invention. The PCI-E bus transaction, PCI-E bus transaction 600 forms the unit of information, which is transferred through a PCI fabric for PCI-E bus transaction 600.

PCI-E bus transaction 600 shows six phases: a frame phase, such as Frame 608; a sequence number, such as Sequence Number 612; a header, such as Header 664; a data phase, such as Data Phase 668; a cyclical redundancy check, such as CRC 672; and a frame phase, such as Frame 680. The PCI-E header, such as Header 664, contains a set of fields defined in the PCI-Express specification. The requester identifier field, such as Requestor ID 628, contains three fields that define the bus transaction requester, these three fields are the: Requestor Bus Number 684, Requestor Device Number 688, and Requestor Function Number 692. The PCI-E header also contains Tag 652, which uniquely identifies the specific bus transaction in relation to other bus transactions that are outstanding between the requestor and the responder. Length 644 contains a count of the number of bytes being sent.

Figure 7:
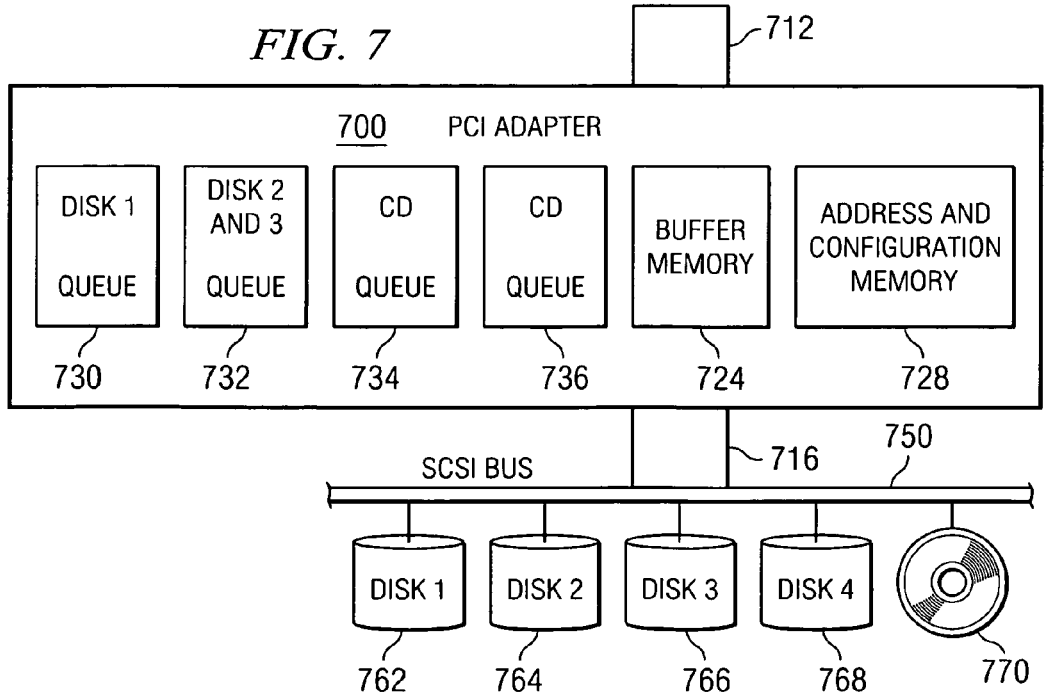
FIG. 7 is a diagram illustrating a Multi-queue PCI Family SCSI Adapter coupled to a plurality of SCSI devices.

FIG. 7 shows a functional block diagram of a PCI Family SCSI Adapter 700, depicted in accordance with a preferred embodiment of the present invention. A PCI Adapter 700 may contain one or more PCI family ports, such as PCI-X or PCI-E port 712. FIG. 7 also shows resources such as Address and Configuration Memory 728, which can be used to store information such as type of SCSI devices attached, number of active queues, MSI levels for the queues, and optional queue priorities. Buffer Memory 724 is used to temporarily store storage data, for example, data read from a SCSI disk and the adapter is about to DMA (Direct Memory Access) into host main memory across PCI Port 712. Four adapter queues are shown. Queue 730 is used to access SCSI Disk 1 device 762. Queue 732 is used to access SCSI Disk 2 device 764 and SCSI Disk 3 device 766. SCSI Disk 4 device 768 does not have a queue at this time; the queue could be added later allowing access to SCSI Disk 4. CD Queue 734 and CD Queue 736 are used to access the SCSI CD device 770. On a partitioned server, the four queues could be owned by one to four logical partitions. On a non-partitioned server, the four queues could be owned by one to four processors or groups of processors. CD Queues 734 and 736 are serially reusable, and only one queue can be used at a time in the preferred embodiment. The host manages arbitration between serially reusable CD Queues 734 and 736. SCSI devices such as a hard disk, a pair of mirrored hard disks, and a RAID array (made by grouping hard disks) can be assigned to only one queue in the preferred embodiment (although one queue can support multiple SCSI devices). A serially reusable device such as tape and optical, can be assigned to multiple queues.

FIG. 7 also shows SCSI Connector 716 and SCSI Bus 750; with attached SCSI Devices 762, 764, 766, 768, and 770. This implementation could use a Parallel SCSI Bus (parallel SCSI storage adapter) or a Serial SCSI Bus (Serial Attached SCSI or SAS storage adapter). Another option for a low cost server is to attach Serial ATA (SATA) devices instead of SCSI devices. SATA devices can be attached by passing through a SAS bus on a SAS storage adapter. In this case, a SATA device driver on the host is used to build SATA commands for the SATA device.

Figure 8:
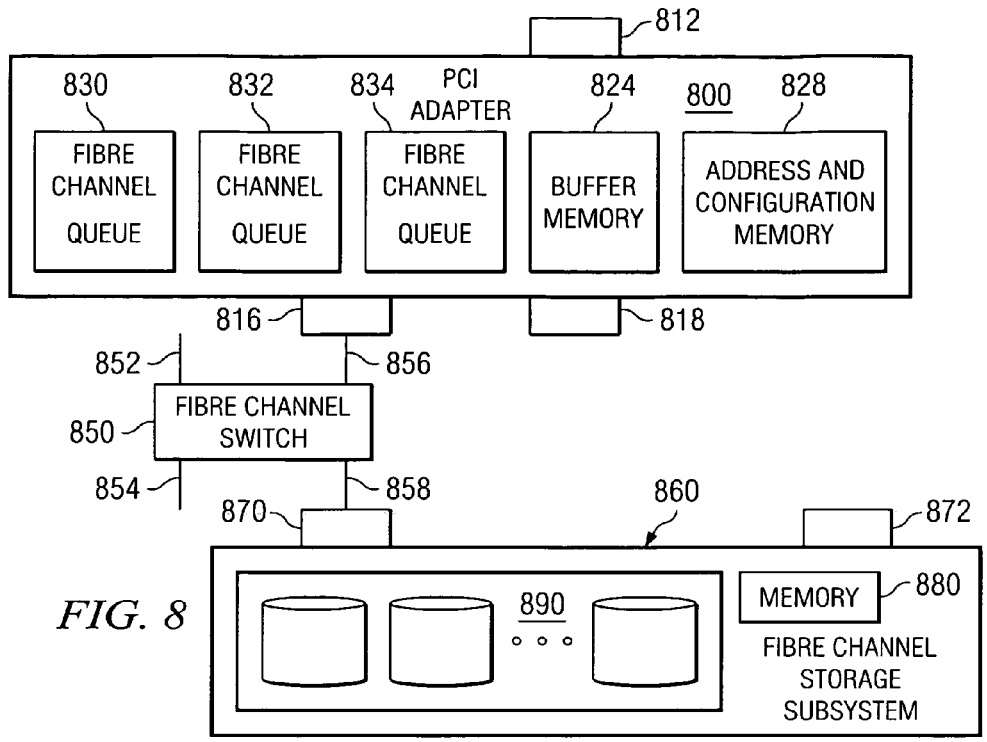
FIG. 8 is a diagram illustrating a Multi-queue PCI Family Fibre Channel Adapter coupled to a fibre channel subsystem.

FIG. 8 shows a functional block diagram of a PCI Family Fibre Channel (FC) Adapter 800, depicted in accordance with a preferred embodiment of the present invention. A PCI Adapter 800 may contain one or more PCI family ports, such as PCI-X or PCI-E port 812. FIG. 8 also shows resources such as Address and Configuration Memory 828, which can be used to store information such as fibre channel ports World Wide Port Names, fibre channel network topology, available fibre channel zones, number of active queues, MSI levels for the queues, and optional queue priorities. Buffer Memory 824 is used to temporarily store storage data, for example, data read from a fibre channel system and the adapter is about to DMA into host main memory across PCI Port 812. Three adapter queues are shown. Queues 830, 832, and 834 are used to access data across the fibre channel network. The queues could access the same or different fibre channel subsystems, and the same or different fibre channel zoned data. Additional queues could be added or current queues could be removed. Information about a current queue can also be updated. On a partitioned server, the three queues could be owned by one to three logical partitions. On a non-partitioned server, the three queues could be owned by one to three processors or groups of processors. Fibre Channel Adapter 800 is shown with two fibre channel Ports 816 and 818. These ports could be connected to the same fibre channel network or different fibre channel networks. A Fibre Channel Adapter can have one or more ports. A Fibre Channel Port typically has one World Wide Port Name. In the preferred embodiment of the present invention, the Port has one World Wide Port Name or a unique N-Port ID Virtualization (NPIV) identifier per queue.

FIG. 8 also shows a Fibre Channel Switch 850 in a fibre channel network; the switch is shown with four ports 852, 854, 856 and 858. Port 856 is coupled to the Fibre Channel Adapter 800, and Port 858 is coupled to the Fibre Channel Storage Subsystem 860. While Ports 852 and 854 are shown as being unused, they could similarly be coupled to other fibre channel adapters or storage subsystems such as 800 and 860. Fibre Channel Storage Subsystem 860 is shown with Fibre Channel Ports 870 and 872, Memory 880, and Disk Storage Devices 890. Port 870 is coupled to Fibre Channel Switch 850 via Port 858. Port 872 is currently unused.

Figure 9:
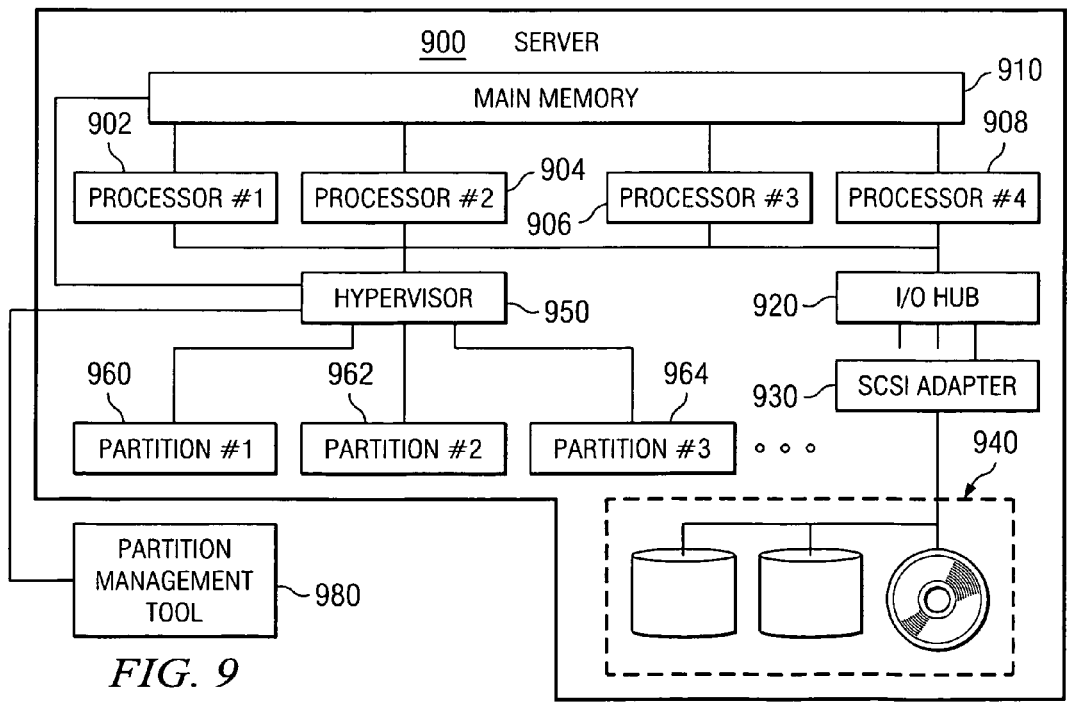
FIG. 9 is a diagram illustrating a partitioned server with Multi-queue PCI Family SCSI Adapter, along with a Partition Management Tool.

FIG. 9 shows a functional block diagram of a logically partitioned Server 900, depicted in accordance with a preferred embodiment of the present invention. Server 900 is shown with an example of four Processors, 902, 904, 906, and 908. Server 900 is shown with Main Memory 910. Server 900 is shown with one I/O Hub 920 (or an I/O bridge), which provides attachment to PCI family adapters, such as SCSI Storage Adapter 930. Local SCSI Storage Devices 940 are shown. Servers can have multiple I/O hubs and typically support multiple PCI adapters.

FIG. 9 also shows a Hypervisor 950. The hypervisor allows the server processors to support multiple partitions, such as Partitions 960, 962, and 964. More or less partitions can be supported. An external Partition Management Tool 980 is shown. A server administrator can use the Partition Management Tool to configure the number of partitions on the server, the OS type running in each partition, the processor resource allocated to each partition (one processor, multiple processors, or a portion of a single processor), main memory allocated to each partition, and which partition owns each PCI adapter. In the preferred embodiment, the Partition Management Tool 980 also depicts SCSI devices under the multiple queue capable SCSI adapters of the present invention, and allows SCSI devices to be assigned to partitions other than the partition that owns the adapter. For serially reuseable SCSI devices such as tape and optical, multiple partitions can be allowed access to a single SCSI device. The Partition Management Tool can run in an external PC, rack mounted PC, a server Service Processor (not shown, but may be included in a server), or in a partition of Server 900.

The Partition Management Tool 980 communicates with the Hypervisor 950 in the preferred embodiment. The hypervisor enforces local partitioning, that is, prohibits one partition from accessing memory that does not belong to the partition. The hypervisor also limits the maximum processor resource that each partition can consume. The hypervisor can also restrict an adapter to only have DMA access to memory that is owned by the partition that owns the adapter. With a multiple queue adapter, the hypervisor is enhanced to allow multiple partitions to have a queue in the adapter, where the adapter can DMA into and out of memory in multiple partitions. The hypervisor may perform necessary address translations, from virtual addresses that are used by applications to PCI addresses that are used by adapters to DMA into and out of main memory.

For a multiple queue adapter, the Partition Management Tool 980 sends additional configuration information to the Hypervisor 950: number of queues, and for each queue: owning partition, SCSI device or devices accessible by the queue, MSI level for the queue, and optional queue priorities. The Hypervisor sends this additional multiple queue configuration to the partition that owns the adapter, which may be a hosting partition. The hosting partition configures the multiple queue adapter to support multiple queues to the specified partitions, with device information for each queue, MSI level for each queue, and optional queue priorities.

Figure 10:
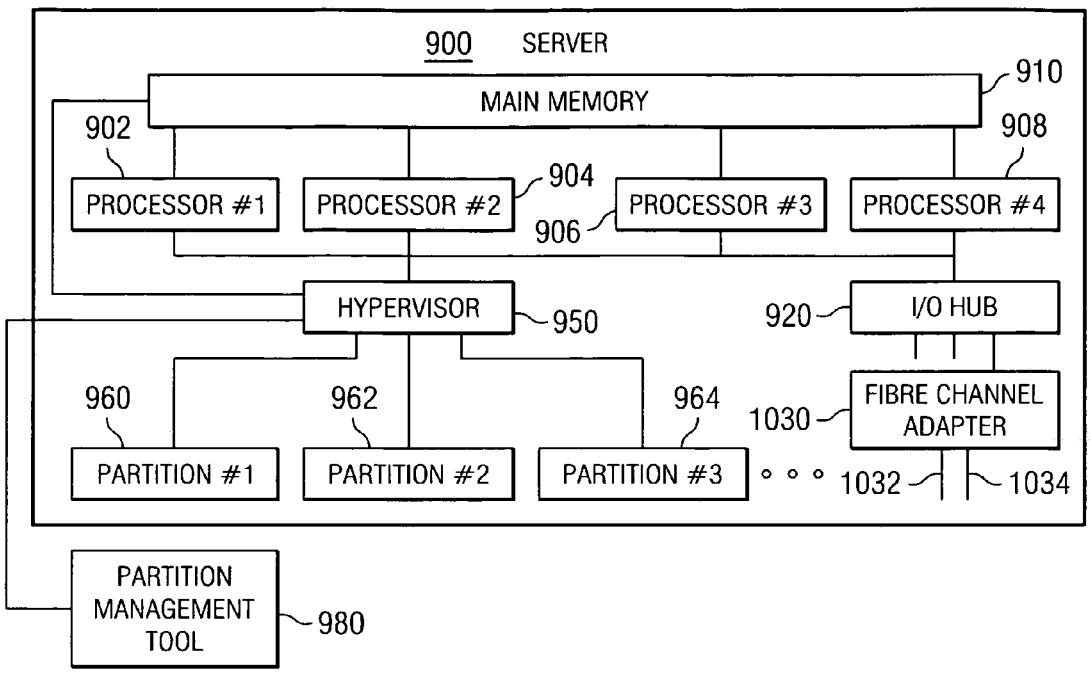
FIG. 10 is a diagram illustrating a partitioned server with Multi-queue PCI Family Fibre Channel Adapter, along with a Partition Management Tool.

FIG. 10 is similar to FIG. 9, but shows a Fibre Channel Adapter 1030 being used instead of a SCSI adapter. The Fibre Channel Adapter 1030 connects to a fibre channel network using Ports 1032 and/or 1034 instead of local SCSI devices.

Figure 11:
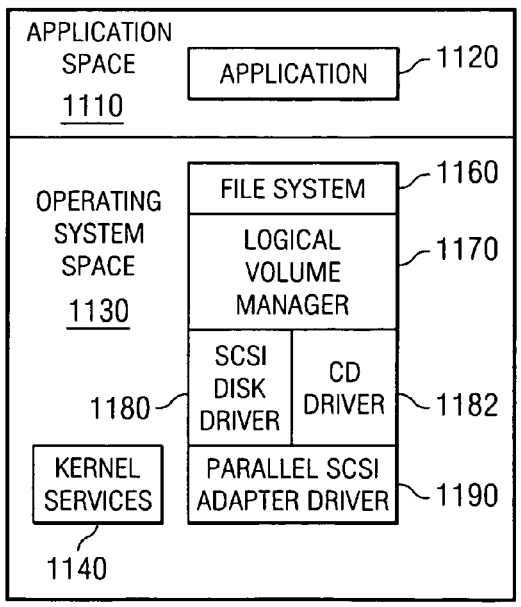
FIG. 11 is a diagram illustrating SCSI storage interfaces in an operating system.

FIG. 11 shows SCSI support in a typical operating system (OS). Applications such as 1120 run in Application Space 1110 (for example, pageable virtual memory). OS Space 1130 includes Kernel Services 1140 and support for SCSI devices attached to a parallel SCSI adapter. File system 1160 allows applications to read from and write to files. Logical Volume Manager (LVM) 1170 can combine or split up storage. For example, LVM could create multiple volumes for the file system 1160 from a single SCSI hard disk. Or, the LVM could combine multiple SCSI hard disks into a single volume for File System 1160. In addition, a RAID array may be seen by the LVM as a single hard disk. If Application 1120 does a read from or write to a SCSI hard disk, the LVM 1170 sends the read or write command to the SCSI disk driver 1180. The SCSI Disk Driver 1180 creates the SCSI commands to read or write the data from the SCSI disk(s). If the SCSI disks are under a parallel SCSI adapter, then the SCSI disk driver 1180 sends the SCSI commands to a parallel SCSI Adapter Driver 1190. The parallel SCSI adapter driver sends the SCSI commands across a PCI family bus to a PCI family parallel SCSI adapter, such as the one depicted in FIG. 7. Note that the SCSI Disk Driver 1180 or Parallel SCSI Adapter Driver 1190 requests the kernel to pin buffers (so they cannot be paged out during a read or write operation) and works with the kernel or hypervisor on a partitioned server to translate buffer addresses from application virtual addresses into adapter PCI addresses to support adapter DMA. In the preferred embodiment, a new type of SCSI adapter driver is created that communicates with a queue on a multiple queue adapter. Additional hypervisor or kernel calls may be required to allow the adapter DMA access to main memory buffers. An adapter driver for a multiple queue adapter is prohibited from global commands to the adapter, for example a Reset command to reset the entire adapter.

FIG. 11 also shows a CD Driver 1182 if the SCSI device is a CD device, and operates similar to that just described for CD devices instead of disk devices.

Figure 12:
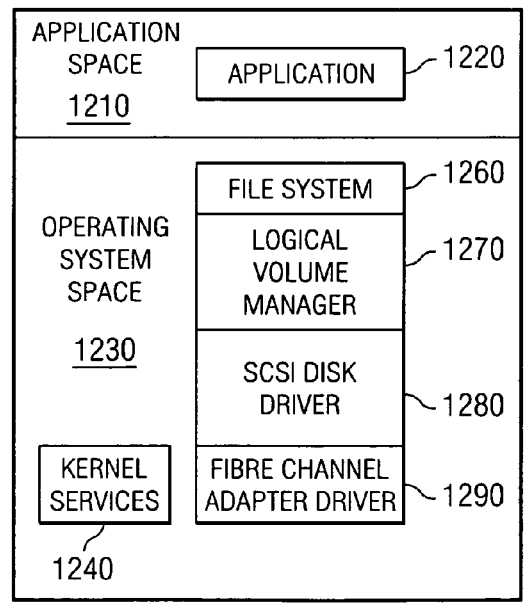
FIG. 12 is a diagram illustrating fibre channel storage interfaces in an operating system.

FIG. 12 shows fibre channel support in a typical OS. Applications such as 1220 run in Application Space 1210. OS Space 1230 includes Kernel Services 1240 and support for fibre channel attached storage. File System 1260 allows applications to read from and write to files. LVM 1270 can combine or split up storage. For example, LVM could create multiple volumes for the File System 1260 from fibre channel attached storage. If Application 1220 does a read from or write to fibre attached storage, the LVM 1270 typically sends the read or write command to the SCSI Disk Driver 1280 (many fibre channel attached storage subsystems use SCSI disks). The SCSI Disk Driver 1280 creates the SCSI commands to read or write the data. If the storage data is accessible through a fibre channel network, then the SCSI Disk Driver 1280 sends the SCSI commands to the Fibre Channel Adapter Driver 1290. The Fibre Channel Adapter Driver sends the SCSI commands across a PCI family bus to a PCI family Fibre Channel Adapter, such as the one shown in FIG. 9, to send across a Fibre Channel Network to a Fibre Channel Storage Subsystem. In the preferred embodiment, a new type of fibre channel adapter driver is created that communicates with a queue on a multiple queue adapter. Additional hypervisor or kernel calls may be required to allow the adapter DMA access to main memory buffers. An adapter driver for a multiple queue adapter is prohibited from global commands to the adapter, for example a Reset command to reset the entire adapter.

Figure 13:
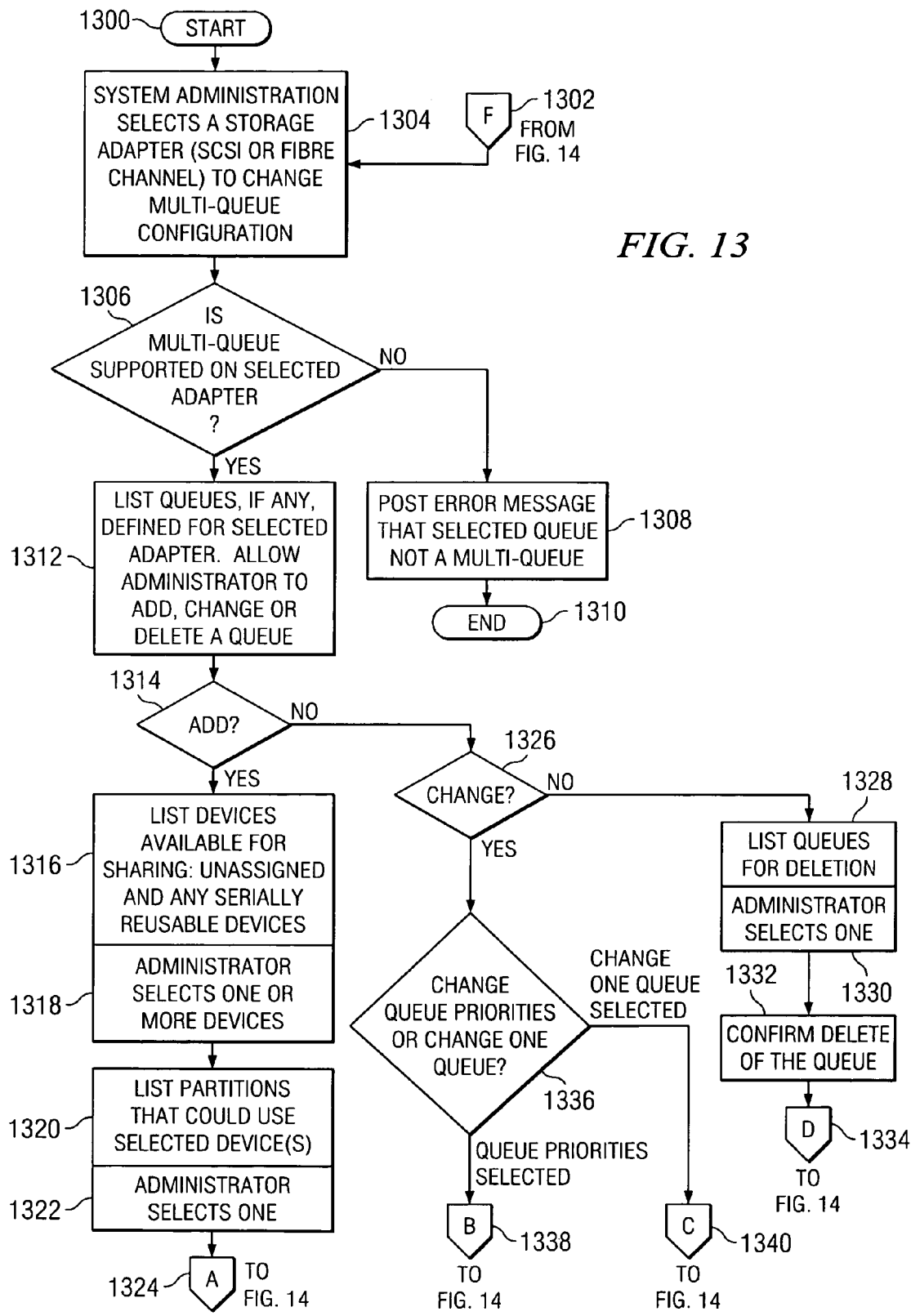
FIGS. 13-18 are flowcharts illustrating the process flow when a system administrator changes the configuration of a multi-queue SCSI adapter using a partition management tool.

Turning now to FIG. 13, there is shown a flow-chart representation of how a system administrator changes the configuration of a SCSI multi-queue adapter, such as SCSI Multi-queue PCI adapter 700 shown in FIG. 7. The process begins at step 1300 and proceeds to step 1304 where the system administrator selects a SCSI storage adapter for which multi-queue configuration changes are desired (for example, using a partition management tool). At step 1306, a determination is made as to whether multi-queue is supported on the selected adapter. If not, an error message is posted at step 1308 and the process terminates at 1310. If multi-queue is supported on the selected adapter, processing proceeds to step 1312 where a list of queues, if any, defined for the selected adapter are presented to the administrator, such that the administrator is allowed to add, change, or delete a queue. If add is selected as determined by step 1314, a list of devices is presented at 1316, including devices available for sharing, devices unassigned and any serially reusable devices. The administrator selects one or more devices at 1318, and a list of partitions that could use the selected device(s) is presented at 1320. The administrator selects one of the partitions at 1322 and processing continues at block 1324 to continue processing at block 1400 of FIG. 14. The configuration changes for the adapter are saved in Partition Management Tool memory, for future use by such Partition Management Tool, at step 1416. A determination is then made at 1418 as to whether any more changes are desired. If yes, processing proceeds to block 1420 to continue processing at block 1302 of FIG. 13. If no more changes are desired, processing proceeds to block 1422 to continue processing at block 1500 of FIG. 15.

Returning back to FIG. 13, if Add a queue is not selected by the administrator as determined at 1314, a determination is made at 1326 whether the administrator has chosen to change a queue or change queue priorities. If yes, processing continues at 1336 where a determination is made on whether the administrator has chosen to change queue priorities or to change a queue. If Change Queue Priorities is selected, processing proceeds to block 1338 to continue processing at block 1402 of FIG. 14. Queues and allowed priorities to be changed for such queues are listed at 1408, and the administrator makes a priority change at 1410. Processing then continues at block 1416, as previously described.

Figure 14:
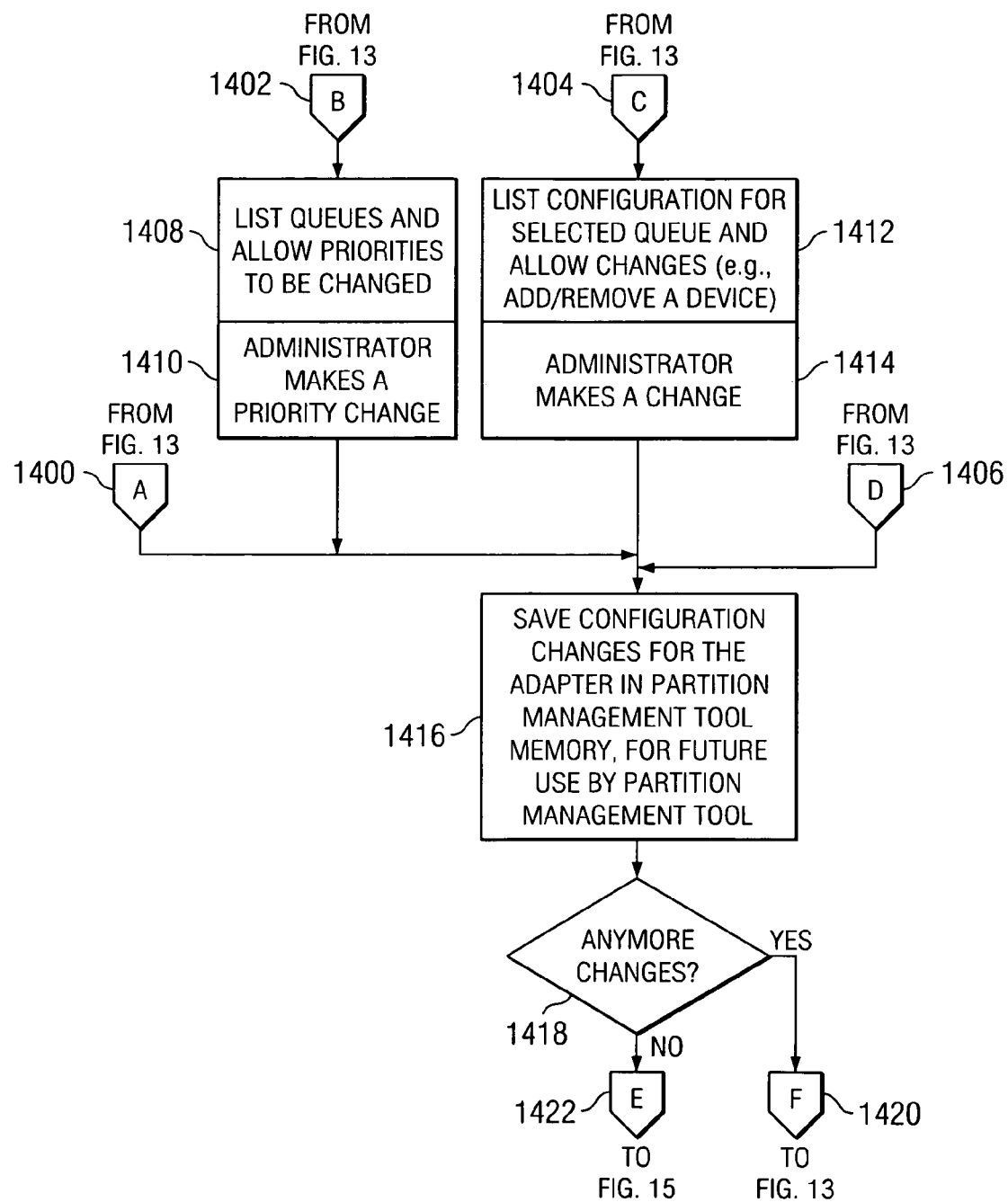

Returning to block 1336 of FIG. 13, if Change One Queue is selected, processing proceeds to block 1340 to continue processing at block 1404 of FIG. 14. Configuration information for the selected queue is listed and changes are allowed to be made by the administration, such as to add or remove a device, at 1412. The administrator makes the changes at 1414, and processing then continues at block 1416 as previously described.

Returning back to FIG. 13, if Change a queue is not selected by the administrator as determined at 1326, a list of queues for Deletion is presented at 1328, and the administrator selects one at 1330. After confirmation is made that the administrator really intends to delete the queue at 1332, processing proceeds to block 1334 to continue processing at block 1406 of FIG. 14. Processing then continues at block 1416 as previously described.

Figure 15:
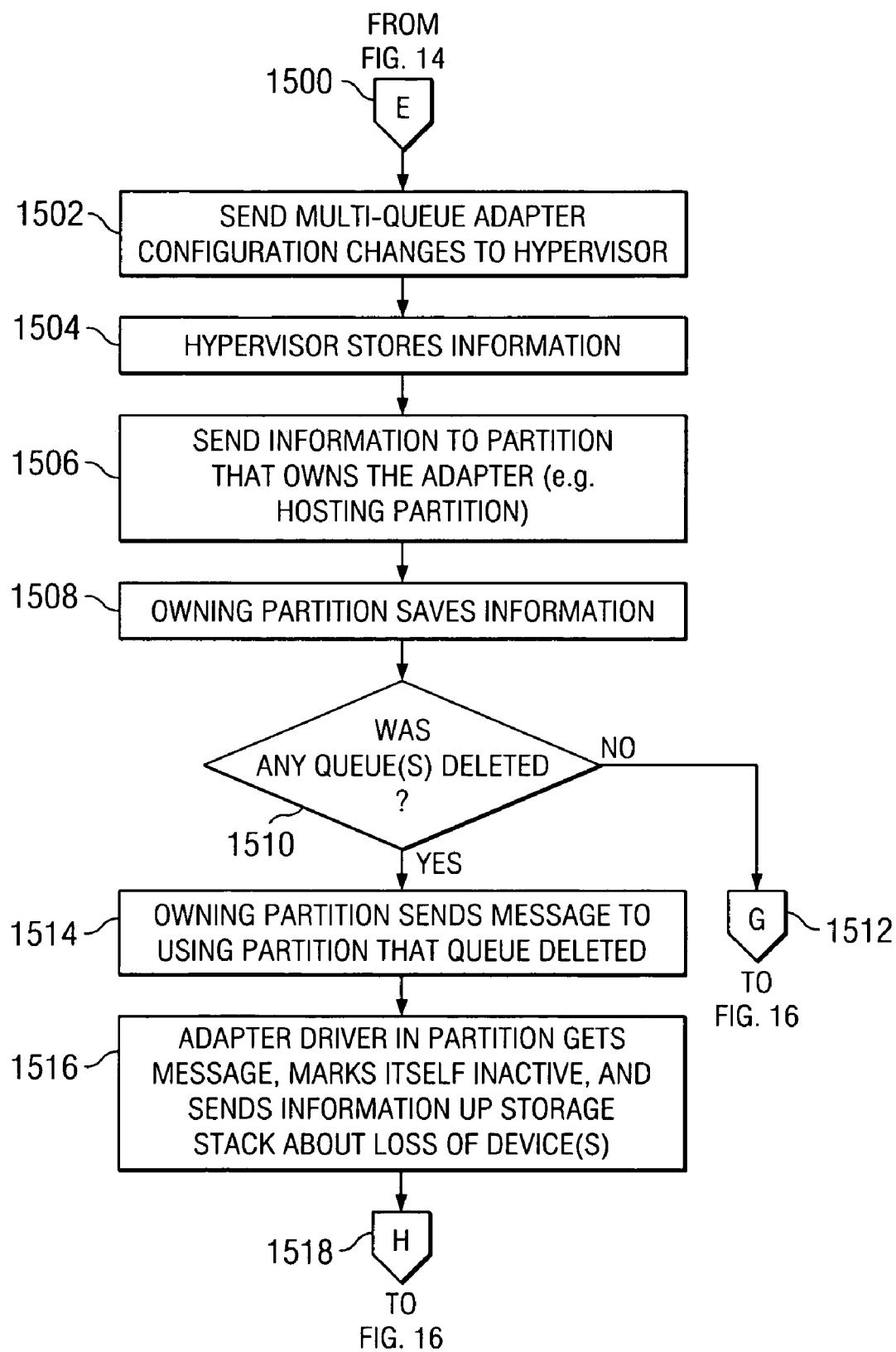

Continuing now to FIG. 15, the state of the current process at 1500 is that configuration changes have been made, and saved in the Partition Management Tool memory (see block 1416 of FIG. 14). The Partition Management Tool then sends the configuration changes for the Multi-queue adapter to the Hypervisor at 1502, such as Hypervisor 950 of FIG. 9. The Hypervisor stores this change information at 1504, in for example flash memory of the Hypervisor, and then sends this information to the partition that owns the adapter, such as for example the hosting partition, at 1506. The owning partition saves this information at 1508. If a queue was deleted, as determined at block 1510, the owning partition sends a message to the partition using the queue that the queue has been deleted at 1514. The adapter driver for this using partition gets the message, marks itself inactive, and sends information up the storage stack about loss of the device(s) at 1516. Processing then proceeds to block 1518 to continue processing at block 1604 of FIG. 16. The owning partition changes the adapter configuration to delete the queue, and then notifies the adapter at 1606. This adapter notification can optionally be delayed until receipt of a response from the using partition. Processing then continues at 1608.

Figure 16:
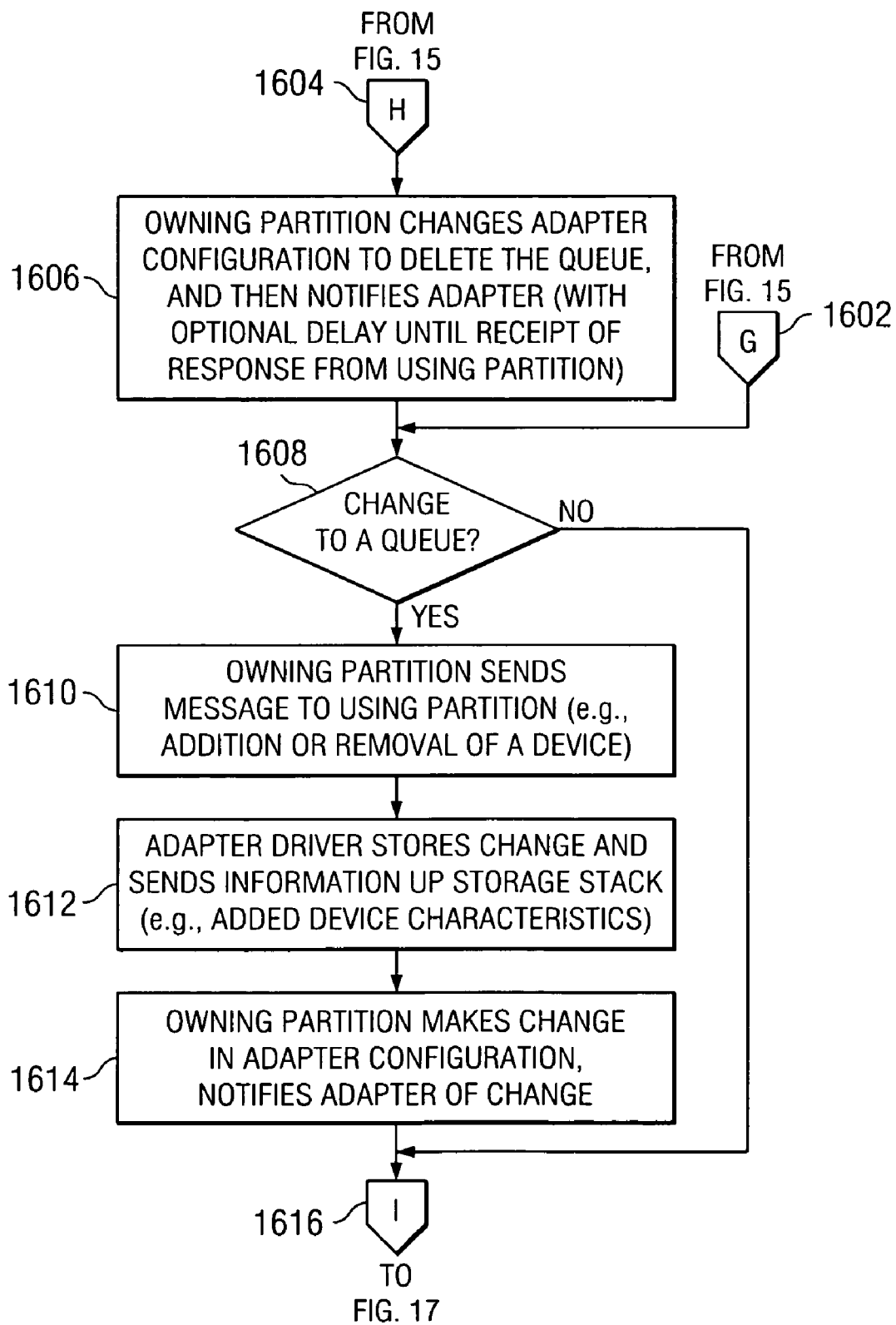

Returning back to block 1510 of FIG. 15, if it is determined that a queue was not deleted, processing proceeds to block 1512 to continue processing at block 1602 of FIG. 16. Processing then continues at 1608.

At 1608 of FIG. 16, a determination is made as to whether a change was made to a queue. If not, processing proceeds to block 1616 to continue processing at block 1702 of FIG. 17. If instead it is determined that a change was made at block 1608, the owning partition sends a message to the partition using the queue of such change, such as the addition or removal of a device associated with the queue, at 1610. The adapter driver stores this change information and then sends this change information up the storage stack at 1612. The owning partition then makes the change in the adapter configuration and notifies that adapter of the change at 1614 with an optional delay waiting for completion confirmation from the adapter driver. Processing then proceeds to block 1616 to continue processing at block 1702 of FIG. 17.

Figure 17:
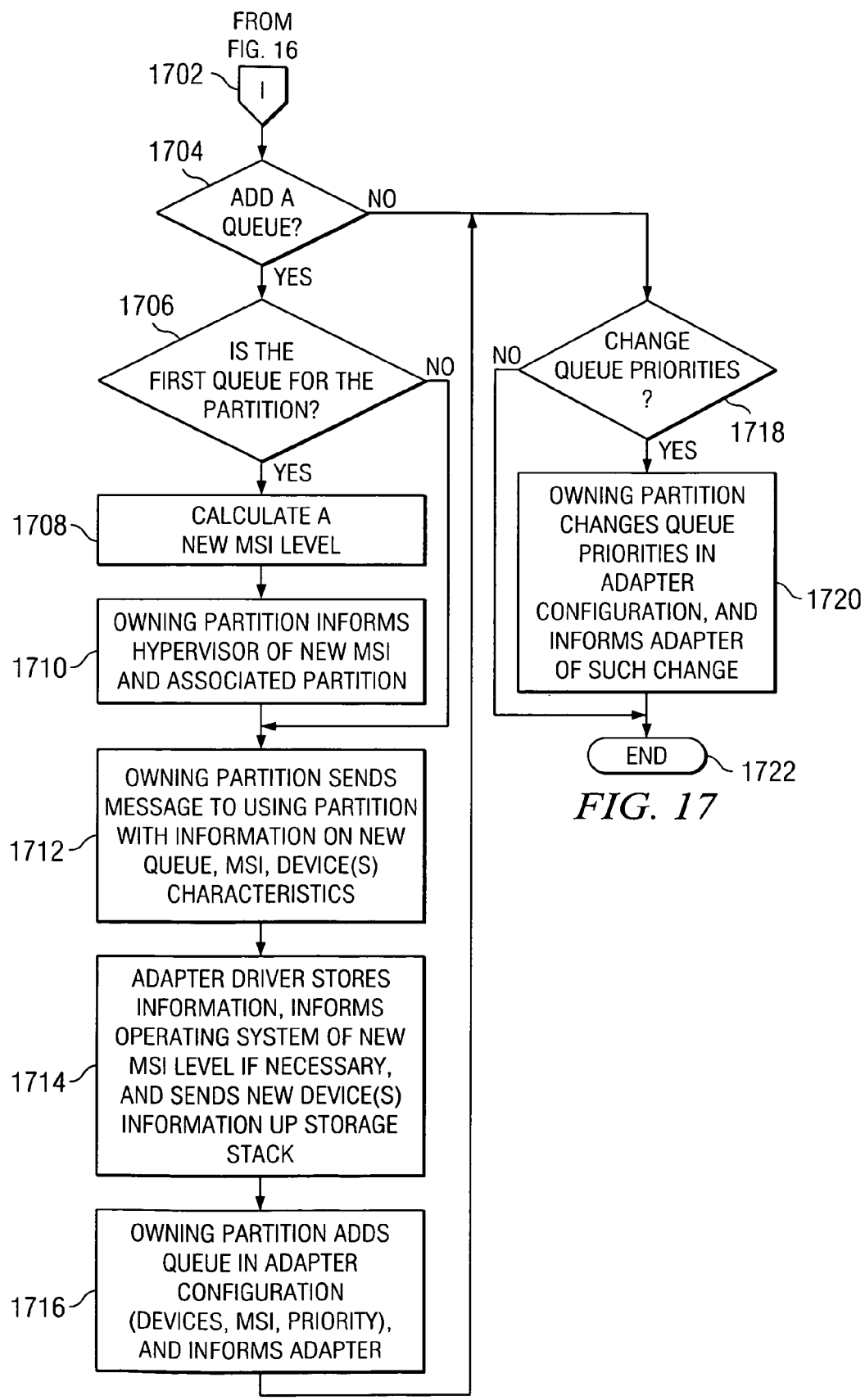

Continuing at block 1702 of FIG. 17, a determination is then made as to whether a queue was added at 1704. If not, processing proceeds to block 1718 (which will be further described below). If instead it is determined that a queue was added at block 1704, a determination is made at 1706 as to whether this is the first queue for the partition. If yes, a new MSI level is calculated at 1708. The owning partition then informs the Hypervisor of the new MSI and associated partition at 1710. The owning partition also sends a message to the using partition with information on the new queue, MSI and device(s) characteristics at 1712. If it was determined at block 1706 that this is not the first queue for the partition, processing proceeds directly to block 1712 where the owning partition sends a message to the using partition with information on the new queue, MSI and device(s) characteristics. Processing then proceeds to block 1714, where the Adapter Driver for the using partition stores this information, informs the operating system of the new MSI level, if necessary, and sends the new device(s) information up the storage stack. The owning partition adds the queue in the adapter configuration (including device(s), MSI and priority) and informs the adapter at 1716. Proceeding from either block 1704 or 1716, a determination is made at 1718 on whether queue priorities have been requested to be changed. If not, the Partition Management Tool multi-queue adapter configuration change process terminates at 1722. If instead it is determined that queue priorities have changed, the Owning Partition changes the queue priorities in the adapter configuration, and informs the adapter of such change at 1720. The Partition Management Tool multi-queue adapter configuration change process then terminates at 1722.

Figure 18:
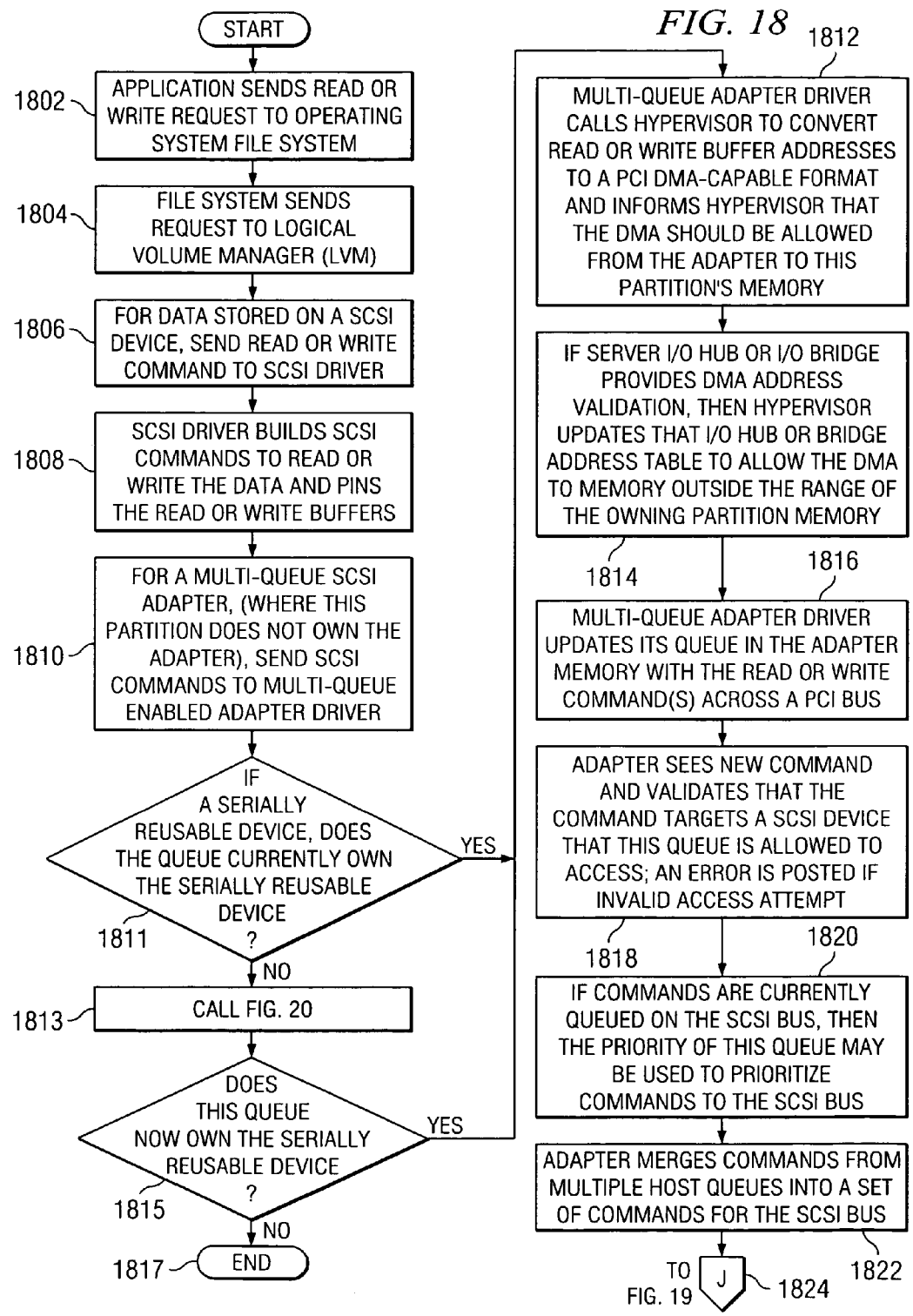

Turning now to the situation where an application program does a read or write to a device, such scenario is described with reference to FIGS. 18-19. This process starts at FIG. 18, where the application program sends a read or write request to the operating file system at 1802. The file system then sends the request to the Logical Volume Manager (LVM) at 1804. For data stored on a SCSI device, the read or write command is sent to the SCSI device driver at 1806. The SCSI device driver builds SCSI commands to read or write the data and pins the read or write buffers at 1808. For a multi-queue SCSI adapter (where this partition does not own the adapter), these SCSI commands are sent to the Multi-queue enabled Adapter driver at 1810. If this is a dedicated queue (to a dedicated device), as determined by block 1811, then processing continues as described below for block 1814. Alternatively, if the read or write command is directed to a serially reusable device and the queue owns such serially reusable device, as determined at block 1811, then the Adapter driver needs to either validate that this adapter driver currently owns the serially reusable device or obtain current ownership of the queue before continuing with block 1814. The extra processing for a serially reusable device is invoked at block 1813, and will be further described below with respect to FIG. 20. Upon return, a determination is made on whether the ownership change was successful at block 1815. If not, processing terminates at 1817 (as will be seen below, if change in ownership was not successful per the procedure described with respect to FIG. 20, an error message is generated). If ownership is now proper, as determined at 1815, processing then proceeds normally to block 1814.

Continuing with block 1814, in this situation there is one Multi-queue enabled Adapter driver instance associated with each multi-queue enabled partition (in a multi-partitioned system) and a set of data in partition memory for each adapter queue. The Multi-queue Adapter driver calls the Hypervisor to convert the read or write buffer addresses to a PCI DMA-capable format, and informs the Hypervisor that the DMA should be allowed from the adapter to this partition's memory at 1812. If a server I/O hub or I/O bridge provides DMA address validation, then the Hypervisor updates that I/O hub or bridge address table to allow the DMA to memory outside the address of the owning partition memory at 1814. The Multi-queue Adapter driver updates the appropriate one of its queues in the adapter memory with the read or write command(s) across a PCI bus at 1816. The Adapter sees the new command and validates that the command targets a SCSI device that this queue is allowed to access at 1818 (either dedicated device owned by this queue or serially reusable device that is currently being used by this queue). In addition at 1818, an error is posted if this is an invalid access attempt for either a dedicated device or a serially reusable device. If commands are currently queued on the SCSI bus, the priority of this queue may be used to prioritize commands to the SCSI bus at 1820, in order to facilitate providing support for time-critical applications that may be running in one or more of the partitions. Because the storage adapter can have multiple queues, and in order to access storage devices through a single SCSI bus between the storage adapter and the SCSI storage devices, the storage adapter needs to take the read and write commands off the different queues and send them across the SCSI bus. The Adapter merges commands from multiple host queues into a set of commands for the SCSI bus at 1822. This is accomplished by provided an internal-use queue on the adapter for use in accessing the SCSI bus by the Adapter, where for each command placed in a queue (such as queues 730-736 of FIG. 7) from the host, these host commands are copied or merged into this internal-use queue for subsequent transfer to the storage devices across the SCSI bus. Processing then proceeds to block 1824 to continue processing at block 1902 of FIG. 19.

Figure 19:
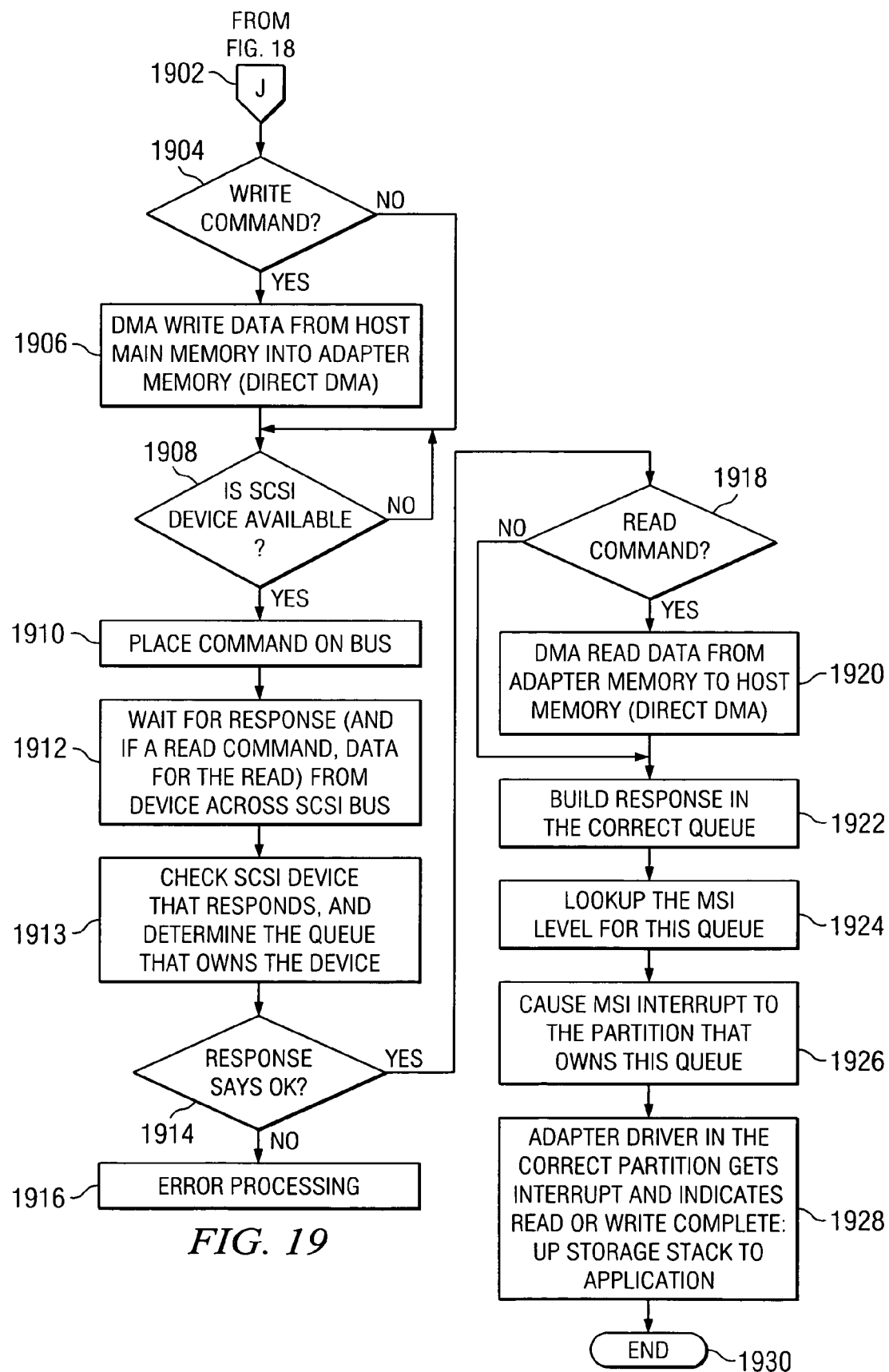
FIG. 19 is a flowchart illustrating the process flow an application program does a read or write command to a device coupled to a SCSI adapter.

Moving on to FIG. 19, a determination is made at 1904 on whether this is a Write command. If so, data from host main memory is written into adapter memory using direct DMA at 1906. It should be noted that this is a direct DMA from the using partition memory to the adapter, with no hosting partition involvement in the write operation. After such DMA write, or if this is not a Write command, processing continues at 1908 where a determination is made on whether the particular SCSI device (the subject to the read or write command) is available. If not, the process waits until the SCSI device becomes available at 1908. When the SCSI device is available, the command is placed on the SCSI bus at 1910. At 1912, the process waits for a response, and if this is a Read command, the data associated with such Read command. At 1913, a check is made that the SCSI device does respond, and a determination is made as to which queue owns the SCSI device; for example, to help validate the response to a command from the queue. If a proper response is not received, as determined by 1914, error processing is invoked at 1916. Depending on the type of error—temporary or permanent—either a retry is attempted or a failure indication is generated and processing of this command is aborted. If a proper response is received, a determination is made as to whether this is a Read command at 1918. If so, read data from adapter memory is transferred to host memory using direct DMA at 1920. After such DMA read, or if this is not a Read command, processing continues at 1922 where a response to the read or write command is built in the correct queue. The MSI level for this queue is determined at 1924, and an MSI interrupt to the partition that owns this queue is invoked at 1926. The Adapter driver in the correct partition gets this interrupt and indicates to the application program that the read or write operation is complete using the storage stack at 1928. The read or write command processing is then complete, and processing ends at 1930.

Figure 20:
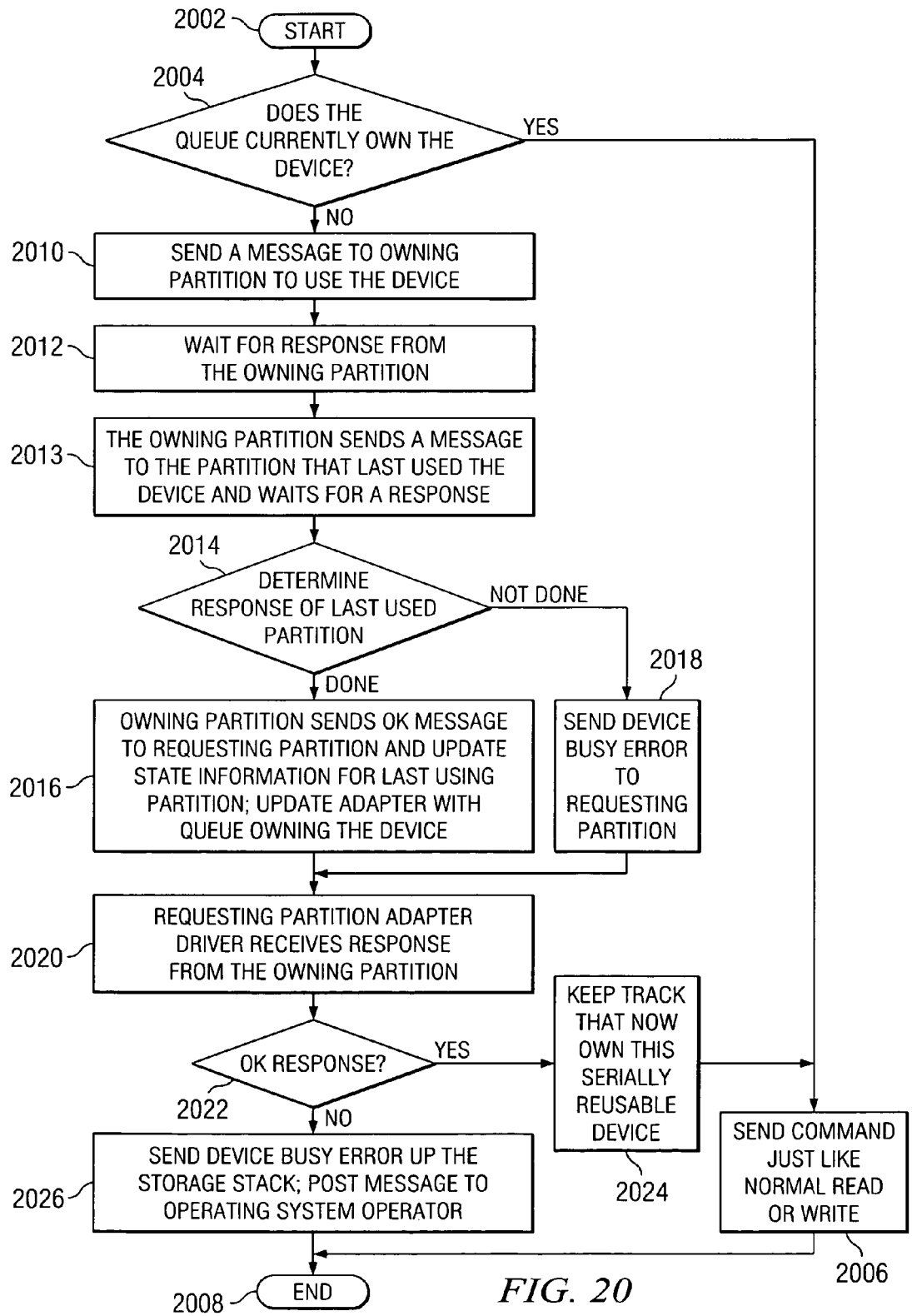
FIG. 20 is a flowchart illustrating the process flow for a read or write command to a serially reusable device.

Turning now to the situation where a serial reusable device is being used, the adapter driver processing for such serially reusable device is described with reference to FIG. 20. The added serially reusable function described in FIG. 20 could be done at the start of block 1811. Multiple queues can access a serially reusable device, with the limitation that only one queue uses the device at a time. Referring to FIG. 20, starting at 2002, processing continues to 2004 where a determination is made as to whether this queue currently is allowed to use (currently owns) the serial reusable device. If so, the read or write command is processed in its normal fashion at 2006 and processing then ends at 2008. If this queue does not currently own the serial reusable device, then a message is sent to the partition that owns the storage adapter (e.g. hosting partition) requesting to use the device at 2010. The requesting partition waits for a response from the owning partition at 2012. The owning partition determines the last partition to use the device and sends a message to the partition and waits for a response, at 2013. The last using partition (adapter driver in that partition) responses and the partition that owns the adapter makes a determination of this response from the last used partition is made at 2014. If the response is Not Done, a Device Busy error message is sent to the requesting partition at 2018, and processing then proceeds to block 2020. If the response is Done, as determnined at 2014, the owning partition sends an OK message to the requesting partition and updates the state information for the last using queue and partition at 2016. In addition, the adapter is updated with the queue currently owning the serially reusable device (the adapter checks for valid usage in block 1818). In either case (Done or Not Done response from last used partition), the requesting partition adapter driver receives a response from the owning partition at 2020, and a determination of this response is made at 2022. If the response is OK, the requesting queue in the partition keeps track that it now currently owns this serially reusable device at 2024, and the read or write command is then sent in normal fashion at 2006, and processing then ends at 2008. It should be noted that the requesting partition, now the partition that currently owns the serially reusable device, can now get messages from the owning (e.g. hosting) partition when another queue in a partition wants to use the device. Thus, the adapter driver keeps state information on its use of the device (e.g., open, use, use, use, close). Returning back to block 2022, if the response is not OK, a Device Busy error is sent up the storage stack, and an error message is posted to the OS operator at 2026, with processing then ending at 2008. The OS operator could determine which other partition is using the device, wait for this usage to end, and retry the original usage attempt.

Figure 21:
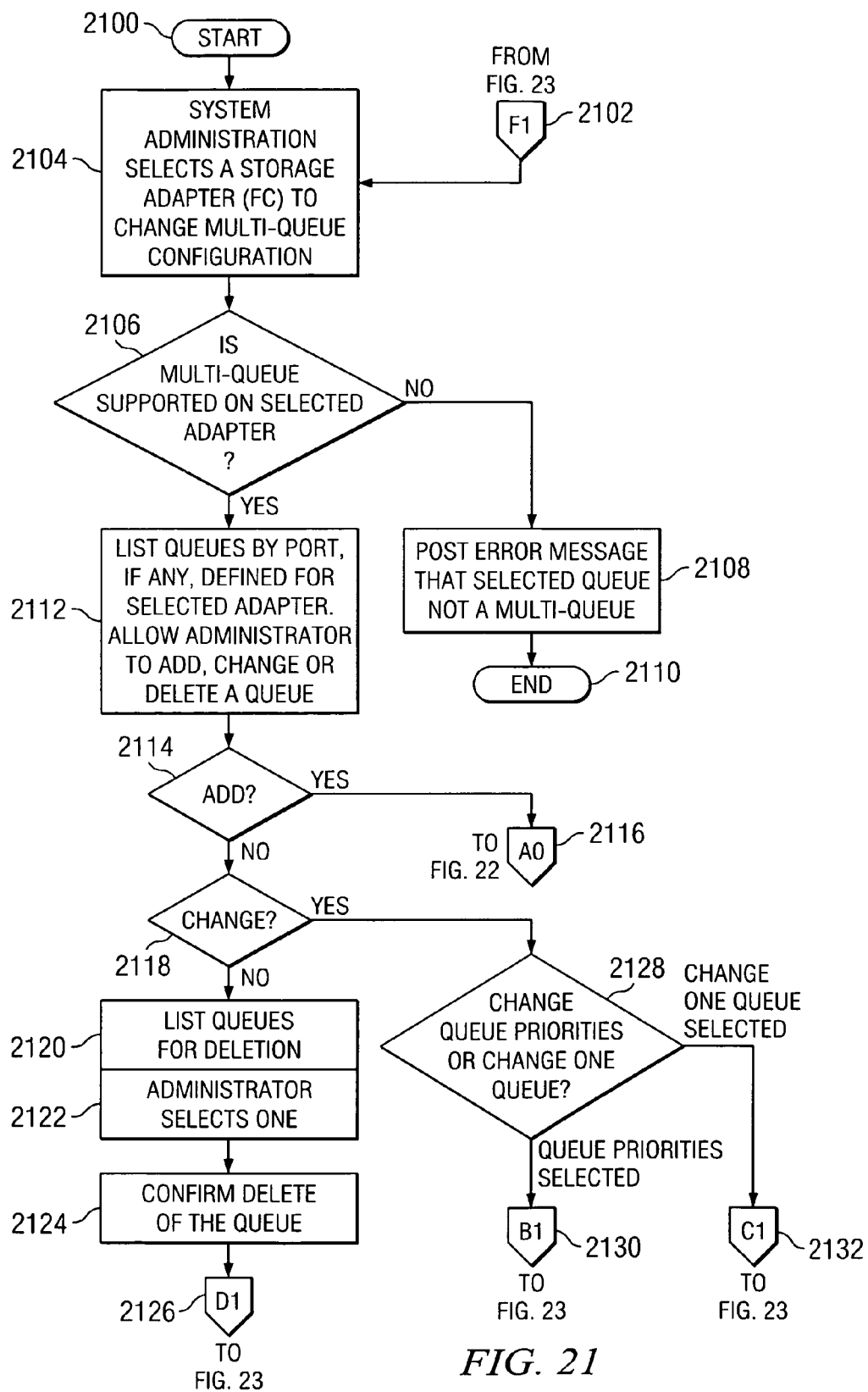
FIGS. 21-26 are flowcharts illustrating the process flow when a system administrator changes the configuration of a multi-queue fibre channel adapter using a partition management tool.
Figure 22:
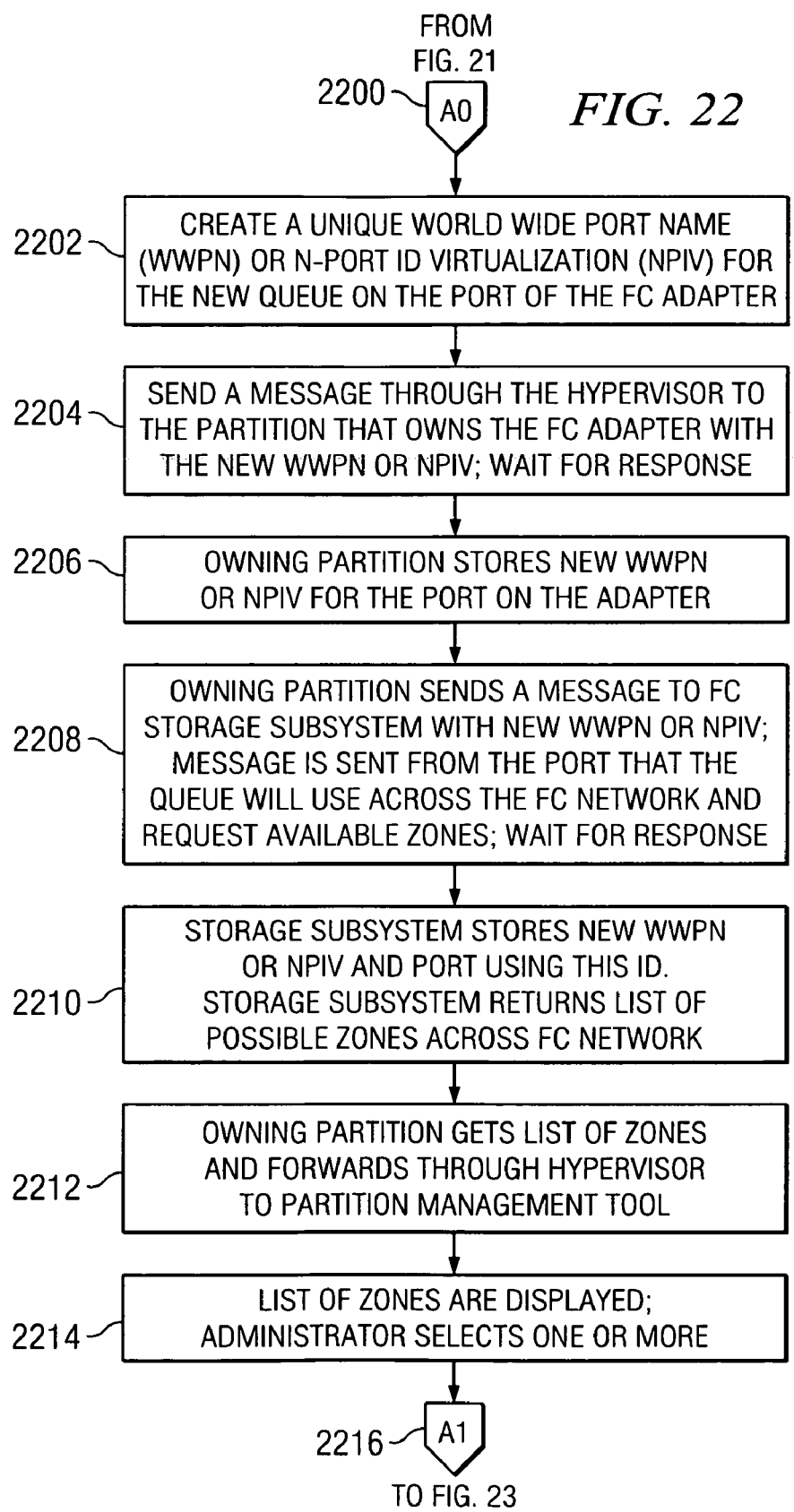

Turning now to FIG. 21, there is shown a flow-chart representation of how a system administrator changes the configuration of a fibre channel (FC) multi-queue adapter, such as Fibre Channel Multi-queue PCI adapter 800 shown in FIG. 8. In this scenario, one of the partitions (such as, for example, one of the partitions 960, 962 and 964 shown in FIG. 10) owns the FC adapter. A fibre channel switch (such as, for example, fibre channel switch 850 shown in FIG. 8) is configured, using traditional techniques, to allow the FC Adapter (with one WWPN per port) to contact a fibre channel storage subsystem (such as, for example, Fibre Channel Storage Subsystem 860 shown in FIG. 8). Continuing with FIG. 21, the process begins at step 2100 and proceeds to step 2104 where the system administrator selects a FC Storage Adapter for which multi-queue configuration changes are desired (for example, using the partition management tool). At step 2106, a determination is made as to whether multi-queue is supported on the selected adapter. If not, an error message is posted at step 2108 and the process terminates at 2110. If multi-queue is supported on the selected adapter, processing proceeds to step 2112 where a list of queues for each port, if any, defined for the selected adapter are presented to the administrator, such that the administrator is allowed to add, change, or delete a queue. As FC adapters typically have multiple ports, a queue is on one port and thus the queues are listed by port. If add a queue for a port is selected as determined by step 2114, processing continues at block 2116 to continue processing at block 2200 of FIG. 22. From there, a unique world wide port name (WWPN) or alternatively, an N-port ID virtualization (NPIV) is created for the new queue on the port of the FC adapter at 2202. Then, a message is sent through the Hypervisor to the partition that owns the FC adapter (e.g. hosting partition) with the new WWPN or NPIV, with a wait for a response from such partition, at 2204. The owning partition stores the new WWPN or NPIV for the new queue for the port on the adapter at 2206. The owning partition then sends a message to the FC Storage Subsystem across the FC network with the new WWPN or NPIV at 2208 and requests available zones, and then waits for a response. At block 2210, the Storage Subsystem stores the new WWPN or NPIV and port using this ID. The Storage Subsystem then returns a list of possible zones that the WWPN or NPIV is allowed to access across the FC Network to the partition owning the FC adapter. At block 2212, the owning partition gets the list of zones and forwards this list through to the Hypervisor to the Partition Management Tool. This list of zones is displayed to the administrator by the Partition Management Tool at 2214, where an administrator can then select one or more of the zones. Processing then continues at block 2216 to continue processing at block 2300 of FIG. 23. The configuration changes for the adapter are saved in Partition Management Tool memory, for future use by such Partition Management Tool, at step 2316. A determination is then made at 2318 as to whether any more changes are desired. If yes, processing proceeds to block 2320 to continue processing at block 2102 of FIG. 21. If no more changes are desired, processing proceeds to block 2322 to continue processing at block 2400 of FIG. 24.

Returning back to FIG. 21, if Add a queue is not selected by the administrator as determined at 2114, a determination is made at 2118 whether the administrator has chosen to change a queue. If yes, processing continues at 2128 where a determination is made on whether the administrator has chosen to change queue priorities or to change a queue. If Change Queue Priorities is selected, processing proceeds to block 2130 to continue processing at block 2302 of FIG. 23. Queues and allowed priorities to be changed for such queues are listed at 2308, and the administrator makes a priority change at 2310. Processing then continues at block 2316, as previously described. Returning to block 2128 of FIG. 21, if Change One Queue is selected, processing proceeds to block 2132 to continue processing at block 2304 of FIG. 23. Configuration information for the selected queue is listed and changes are allowed to be made by the administration, such as to add or remove a zone, at 2312. The administrator makes the changes at 2314, and processing then continues at step 2316 as previously described.

Returning back to FIG. 21, if Change a queue is not selected by the administrator as determined at 2118, a list of queues for Deletion is presented at 2120, and the administrator selects one at 2122. After confirmation is made that the administrator really intends to delete the queue at 2124, processing proceeds to block 2126 to continue processing at block 2306 of FIG. 23. Processing then continues at step 2316 as previously described.

Figure 23:
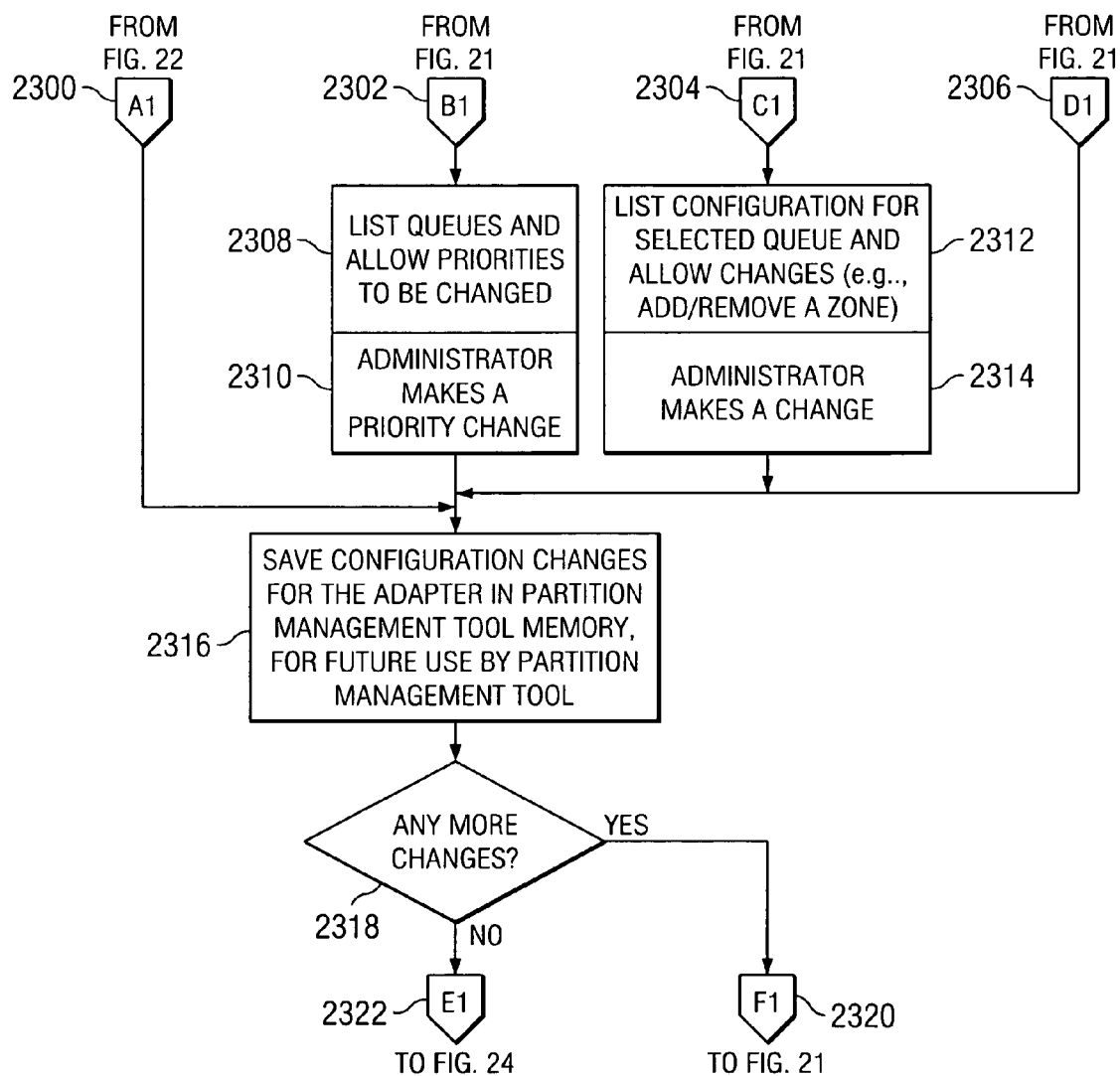
Figure 24:
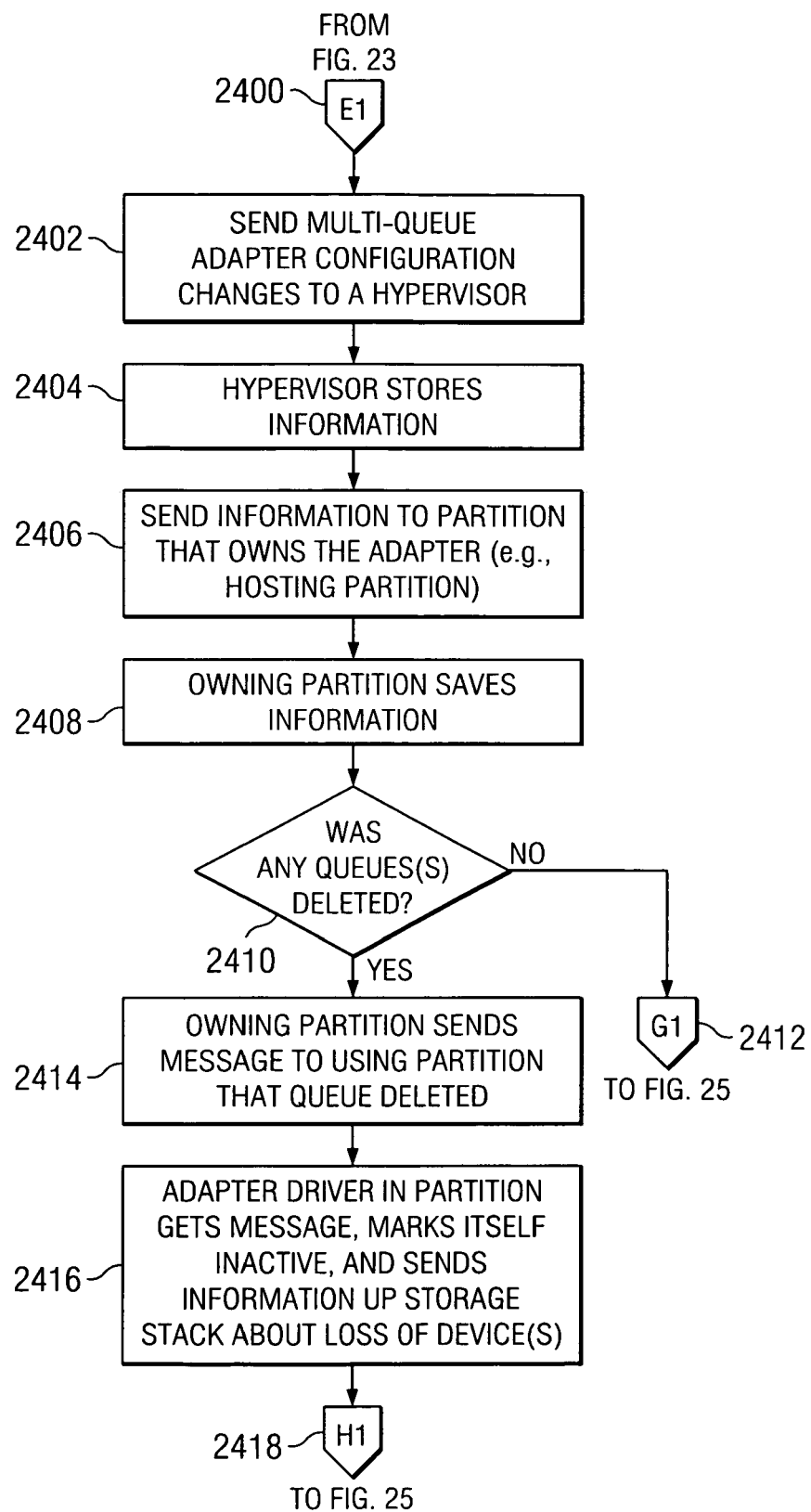

Continuing now to FIG. 24, the state of the current process at 2400 is that configuration changes have been made, and saved in the Partition Management Tool memory (see block 2316 of FIG. 23). The Partition Management Tool then sends the configuration changes for the Multi-queue adapter to the Hypervisor at 2402, such as Hypervisor 950 of FIG. 9. The Hypervisor stores this change information at 2404, in for example flash memory of the Hypervisor, and then sends this information to the partition that owns the adapter, such as for example the hosting partition, at 2406. The owning partition saves this information at 2408. If a queue was deleted, as determined at block 2410, the owning partition sends a message to the partition using the queue that the queue has been deleted at 2414. The adapter driver for this using partition gets the message, marks itself inactive, and sends information up the storage stack about loss of the device(s) at 2416. Processing then proceeds to block 2418 to continue processing at block 2504 of FIG. 25. The owning partition changes the adapter configuration to delete the queue, and then notifies the adapter at 2506. This adapter notification can optionally be delayed until receipt of a response from the using partition. Processing then continues at 2508.

Figure 25:
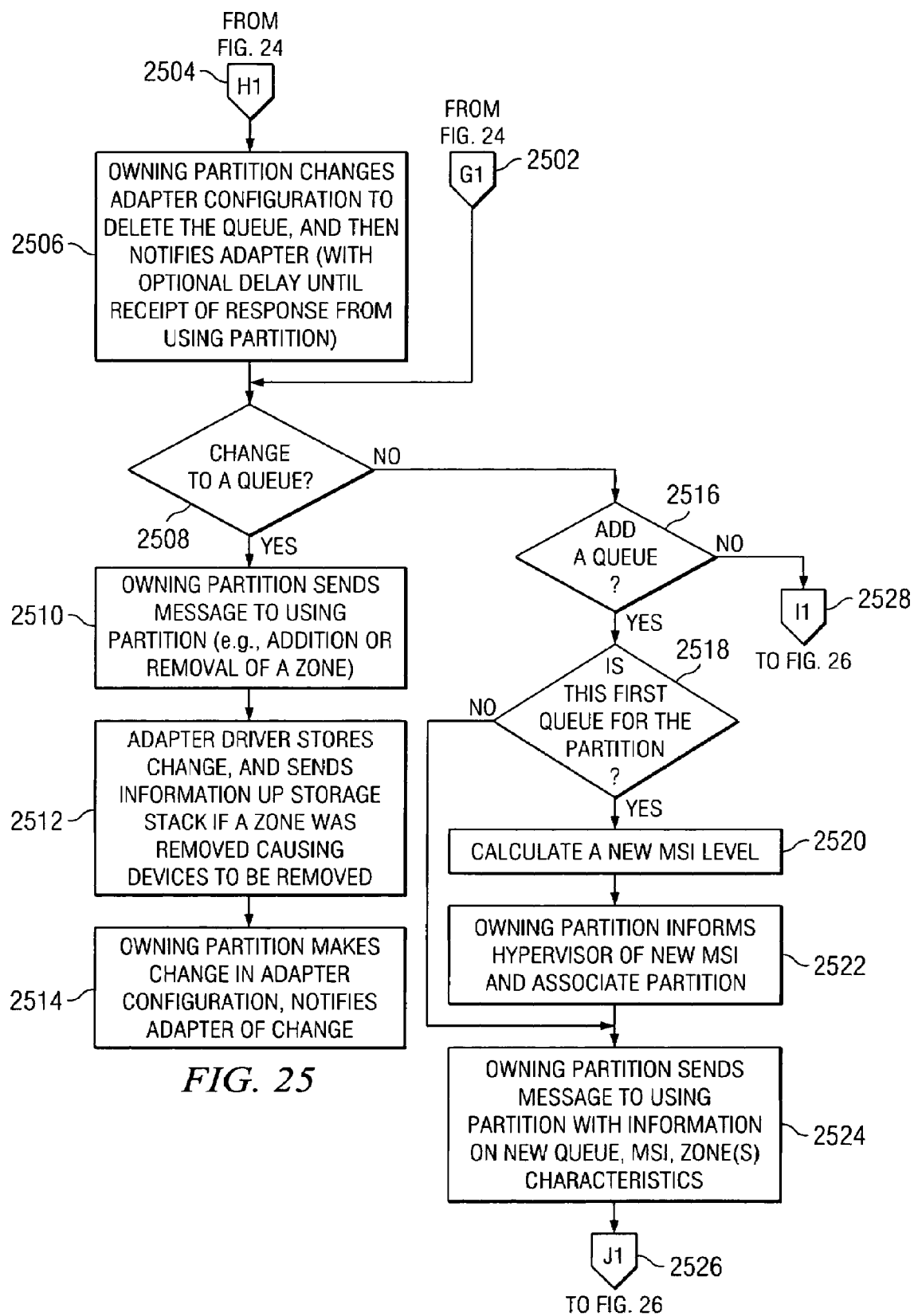

Returning back to block 2410 of FIG. 24, if it is determined that a queue was not deleted, processing proceeds to block 2412 to continue processing at block 2502 of FIG. 25. Processing then continues at 2508.

At 2508 of FIG. 25, a determination is made as to whether a change was made to a queue. If not, processing proceeds to block 2516 (which will be further described below). If instead it is determined that a change was made at block 2508, the owning partition sends a message to the partition using the queue of such change, such as the addition or removal of a zone associated with the queue, at 2510. The adapter driver stores this change information and then sends this change information up the storage stack if a zone was removed causing devices to be removed at 2512. The owning partition then makes the change in the adapter configuration and notifies that adapter of the change at 2514. Processing then proceeds to block 2516 to continue processing.

Continuing at block 2516, a determination is then made as to whether a queue was added. If not, processing proceeds to block 2528 to continue processing at block 2602 of FIG. 26. If instead it is determined that a queue was added at block 2516, a determination is made at 2518 as to whether this is the first queue for the partition. If yes, a new MSI level is calculated at 2520. The owning partition then informs the Hypervisor of the new MSI and associated partition at 2522. The owning partition also sends a message to the using partition with information on the new queue, MSI and zone(s) characteristics at 2524. If it was determined at block 2518 that this is not the first queue for the partition, processing proceeds directly to block 2524 where the owning partition sends a message to the using partition with information on the new queue, MSI and zone(s) characteristics. Processing then proceeds to block 2526 to continue processing at block 2604 of FIG. 26. At block 2606 of FIG. 26, the adapter driver for the using partition stores this information, and informs the operating system of the new MSI level, if necessary. The owning partition adds the queue in the adapter configuration (including MSI and priority) and informs the adapter at 2608. Processing then continues at 2610.

Figure 26:
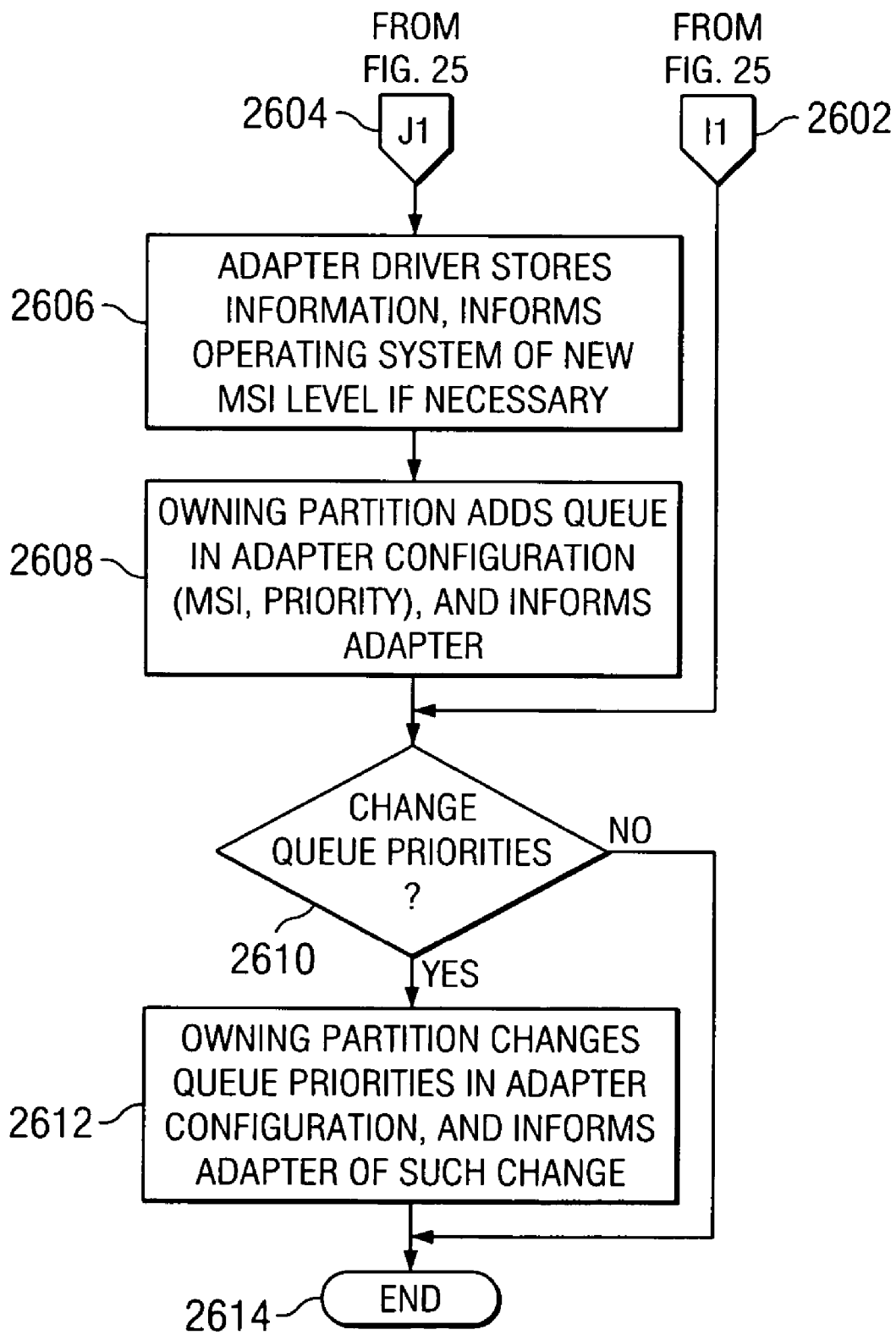

Proceeding from either block 2602 or 2608 of FIG. 26, a determination is made at 2610 on whether queue priorities have been requested to be changed. If not, the Partition Management Tool multi-queue adapter configuration change process terminates at 2614. If instead it is determined that queue priorities have changed, the owning partition changes the queue priorities in the adapter configuration, and informs the adapter of such change at 2612. The Partition Management Tool multi-queue adapter configuration change process then terminates at 2614.

Figure 27:
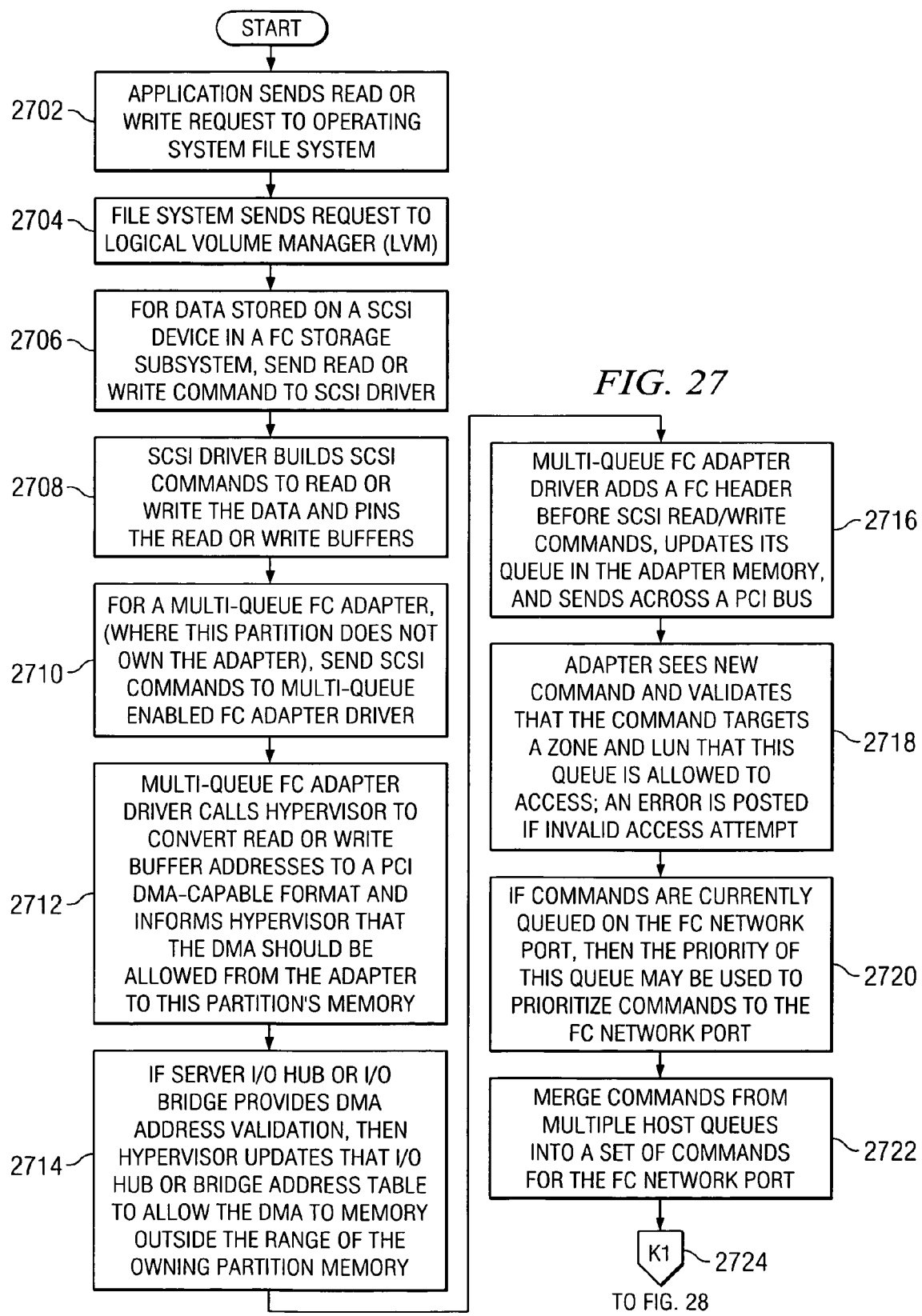
FIGS. 27-28 are flowcharts illustrating the process flow an application program does a read or write command to a device coupled to a fibre channel adapter.

Turning now to the situation where an application program does a read or write to a device, such scenario is described with reference to FIGS. 27-28. This process starts at FIG. 27, where the application program sends a read or write request to the operating file system at 2702. The file system then sends the request to the Logical Volume Manager (LVM) at 2704. For data stored on a SCSI device in a Fibre Channel Storage Subsystem, the read or write command is sent to the SCSI device driver at 2706. The SCSI device driver builds SCSI commands to read or write the data and pins the read or write buffers at 2708. For a multi-queue SCSI adapter (where this partition does not own the adapter), these SCSI commands are sent to the Multi-queue enabled FC Adapter driver at 2710. The Multi-queue FC Adapter driver calls the Hypervisor to convert the read or write buffer addresses to a PCI DMA-capable format, and informs the Hypervisor that the DMA should be allowed from the adapter to this partition's memory at 2712. If a server I/O hub or I/O bridge provides DMA address validation, then the Hypervisor updates that I/O hub or bridge address table to allow the DMA to memory outside the address of the owning partition memory at 2714. The Multi-queue Adapter driver updates its queues in the adapter memory, adds an FC header before the SCSI read or write command(s), and sends this across a PCI bus at 2716. The adapter sees the new command and validates that the command targets a zone and logical unit number (LUN) that this queue is allowed to access at 2718. In addition at 2718, an error is posted if this is an invalid access attempt. If commands are currently queued on the FC Network Port, the priority of this queue may be used to prioritize commands to the FC Network Port at 2720. The adapter merges commands from multiple host queues into a set of commands for the FC Network Port at 2722, in similar fashion to that described above with respect to the SCSI bus embodiment described with respect to FIG. 29, but the internal-use queue is for data transfer between the Adapter and the fibre channel port. Processing then proceeds to block 2724 to continue processing at block 2802 of FIG. 28.

Figure 28:
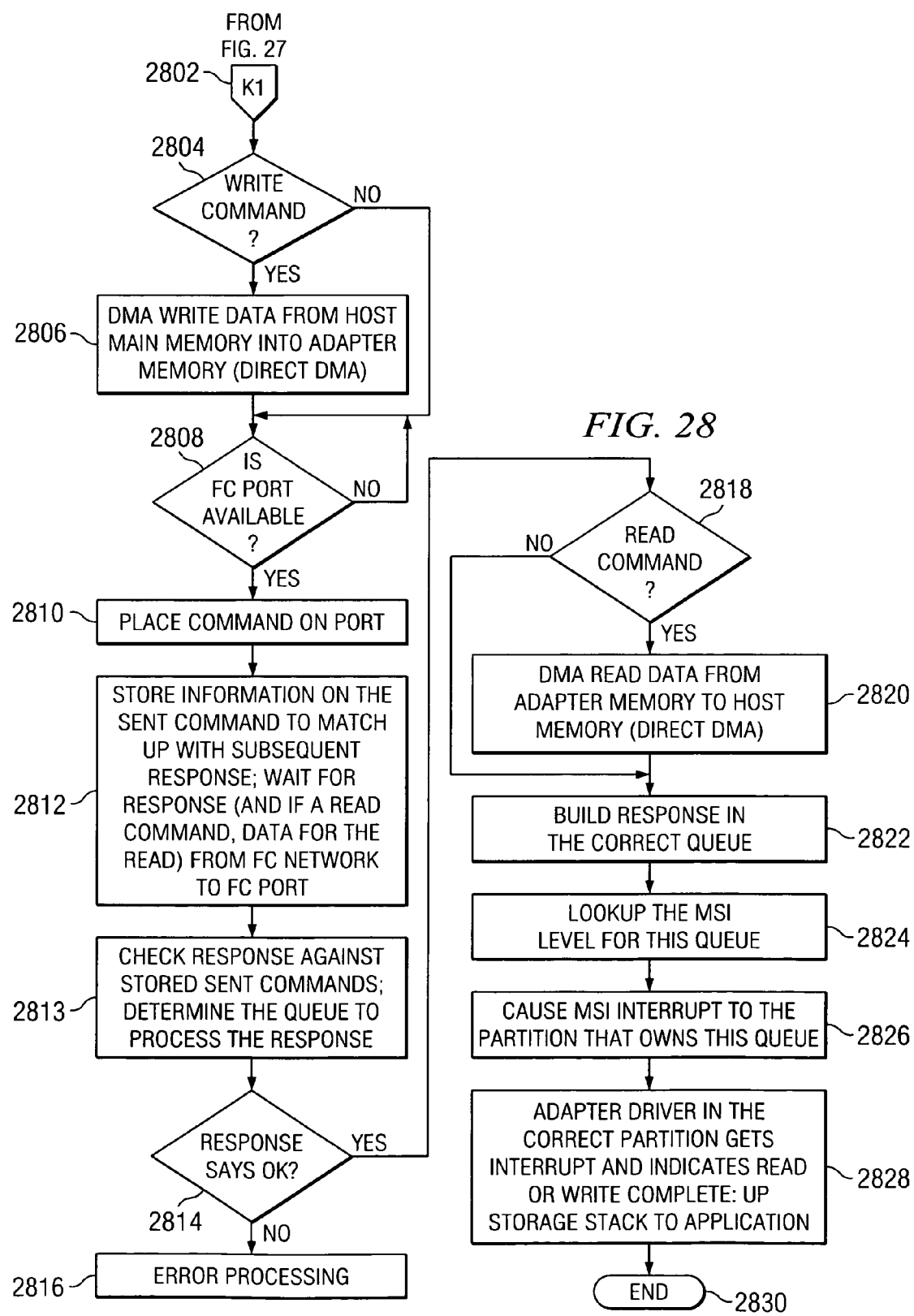

Moving on to FIG. 28, a determination is made at 2804 on whether this is a Write command. If so, data from host main memory is written into adapter memory using direct DMA at 2806. It should be noted that this is a direct DMA from the using partition memory to the adapter, with no hosting partition involvement in the Write operation. After such DMA write, or if this is not a Write command, processing continues at 2808 where a determination is made on whether the particular FC port (the subject to the read or write command) is available. If not, the process waits until the FC Port becomes available at 2808. Queue priorities can optionally be used to determine the order in which commands are sent out on the port. When the FC Port is available, the command is placed on the FC port at 2810. At 2812, the process waits for a response from the FC network to the FC port, and if this is a Read command, the data associated with such Read command. At 2813, a check is made that a response is received, and a determination is made as to which queue is responsible to process the response. If a proper response is not received, as determined by 2814, error processing is invoked at 2816. Depending on the type of error—temporary or permanent—either a retry is attempted or a failure indication is generated and processing of this command is aborted. If a proper response is received, a determination is made as to whether this is a Read command at 2818. If so, read data from adapter memory is transferred to host memory using direct DMA at 2820. After such DMA read, or if this is not a Read command, processing continues at 2822 where a response to the Read or Write command is built in the correct queue. The MSI level for this queue is determined at 2824, and an MSI interrupt to the partition that owns this queue is invoked at 2826. The Adapter driver in the correct partition gets this interrupt and indicates to the application program that the read or write operation is complete using the storage stack at 2828. The read or write command processing is then complete, and processing ends at 2830.

Figure 29:
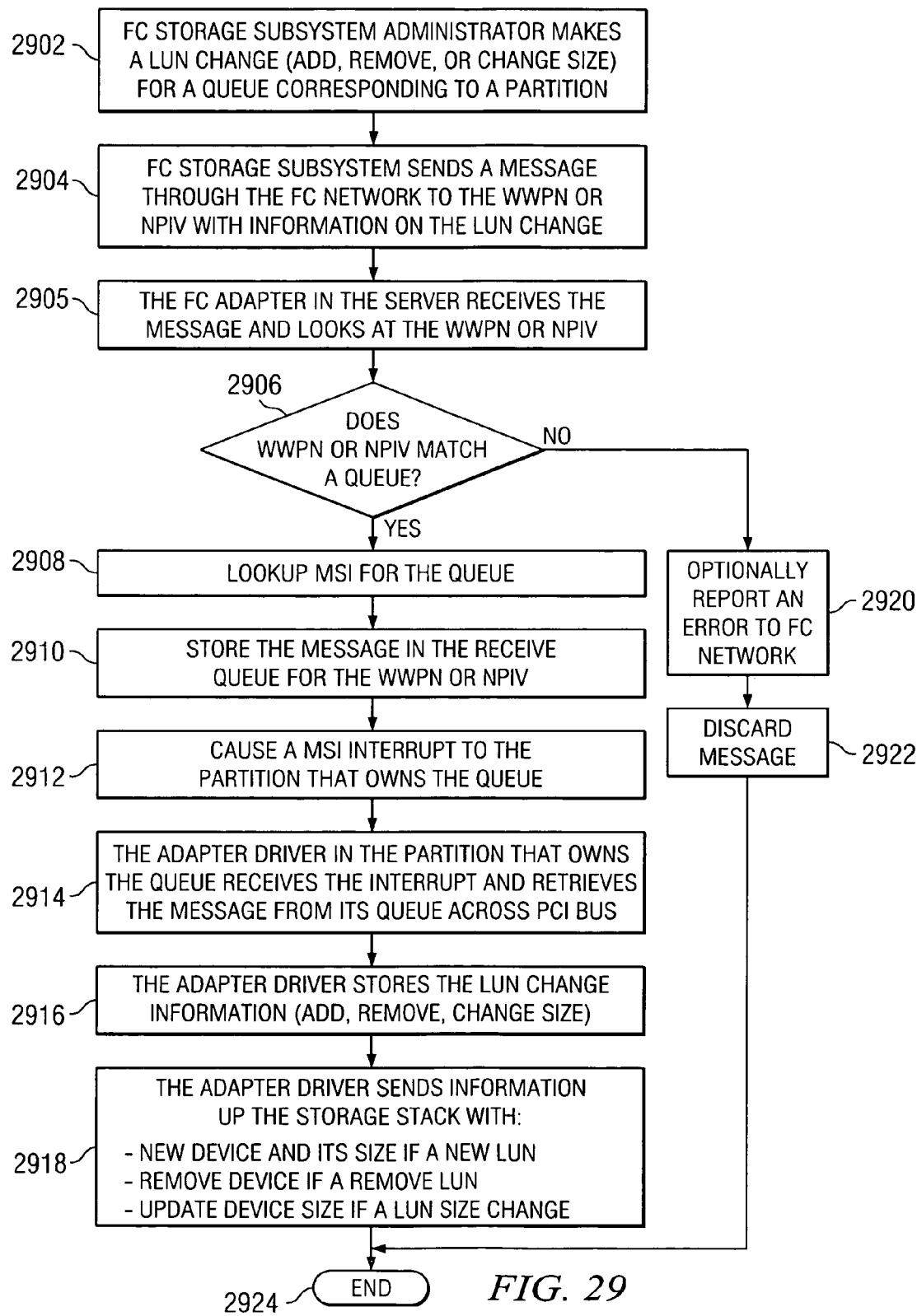
FIG. 29 is a flowchart illustrating the process flow for when a fibre channel storage subsystem administrator makes a LUN change within such storage subsystem.

In order for a host computer (a partition, in this case) to access storage on a FC Storage Subsystem, storage must be allocated in the Storage Subsystem for the host (based on the WWPN or NPIV associated with the queue for the partition). If the new WWPN or NPIV for a queue has been sent to the FC Storage Subsystem (as in block 2208 of FIG. 22), then it is easier for the storage subsystem administrator to allocate storage for the new WWPN or NPIV. FC storage subsystem storage is typically allocated in a logical unit or logical units (LUN or LUNs). A LUN can be nearly any size such as a small amount of storage or a large amount of storage. In the flowchart of FIG. 29, a FC storage subsystem administrator adds a new LUN, removes an existing LUN, or changes the size of a LUN for a host (in this case, for a queue associated with a partition).

Continuing now with FIG. 29, a FC storage subsystem administrator makes a LUN change for a queue corresponding to a partition at 2902. The FC Storage Subsystem then sends a message through the FC network to the WWPN or NPIV with information in the LUN change at 2904. The FC Adapter in the Server receives the message and looks at the WWPN or NPIV at 2905. If a match is found, as determined at 3006, the MSI for the queue is looked up at 2908, and the message is stored in the receive queue for the WWPN or NPIV at 2910. An MSI interrupt is then invoked to the partition that owns the queue at 2912. The FC adapter driver in the partition that owns the queue receives the interrupt and retrieves the message from its queue across the PCI bus at 2914. The FC adapter driver stores the LUN change information, such as Add, Remove, Change Size, at 2916. At 2918, the FC adapter driver then sends information up the storage stack pertaining to the new device and its size of a new LUN, the removed device is a LUN was removed, or updated device size of a LUN size was changed. Processing then terminates at 2924. Going back to block 2906, if no WWPN or NPIV match occurs, an error is optionally reported to the FC network at 2920, and the FC adapter discards the message at 2922. Processing then terminates at 2924.

Thus, the present invention provides an improved I/O adapter, for use in a multi-processor data processing system, having a plurality of queues which are configurable for supporting a plurality of adapter drivers for use by a plurality of processors in the multi-processor data processing system. With the present invention, multiple adapter drivers (running either in different partitions on a partitioned server or driven by different threads on a non-partitioned server) can send commands to a SCSI or Fibre Channel Adapter, each adapter driver being associated with its own queue.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, while the preferred embodiment is shown as electronic circuitry, it would also be possible to implement the inventive concepts in microcode or other form of software routine. The embodiment was chosen and described in order to best explain the principles of the invention, the practical application, and to enable others of ordinary skill in the art to understand the invention for various embodiments with various modifications as are suited to the particular use contemplated.

What is claimed is:

1. A multi-partitioned data processing system, comprising a multi-processor data processing system server having a plurality of processors, a main memory, a plurality of partitions and a plurality of system images, wherein a system image of the plurality of the system images is executable in a given partition associated with each one of the plurality of processors, said data processing system further comprising:

a fibre channel adapter comprising a processor port, a plurality of fibre channel device ports and a plurality of queues, wherein one of the plurality of queues is accessible by one of the plurality of processors and another of the plurality of queues is accessible by another of the plurality of processors;

a first device coupled to one of the plurality of fibre channel device ports and a second device coupled to another of the plurality of fibre channel device ports, wherein a first system image of the plurality of system images is executable in a first partition and accesses the first device using at least one first queue of the plurality of queues while a second system image of the plurality of system images is executable in a second partition and accesses the second device using at least one second queue of the plurality of queues; and a supervisor system, separate from the plurality of partitions, that (1) configures the plurality of queues of the fibre channel adapter to enable access to the plurality of queues by the first system image and the second system image, and (2) enforces local partitioning of the plurality of partitions by prohibiting one partition from accessing memory of the main memory that is associated with another partition of the plurality of partitions, wherein one partition associated with one of the plurality of processors is a hosting partition that configures the plurality of queues of the fibre channel adapter as specified by the supervisor system.

2. The system of claim 1, wherein the supervisor system performs address translation from virtual addresses used by the plurality of system images running in the plurality of partitions to physical addresses used by the fibre channel adapter.

3. The system of claim 1, wherein the supervisor system configures at least one first queue of the plurality of queues to be directly accessible by the first system image.

4. The system of claim 3, wherein the supervisor system configures at least one second queue of the plurality of queues to be directly accessible by the second system image.

5. The system of claim 1, wherein the supervisor system (1) stores configuration changes made to the fibre channel adapter in a supervisor memory of the supervisor system and (2) sends the configuration changes to the hosting partition.

6. The system of claim 1, wherein multiple queues of the plurality of queues are associated with a given system image to thereby provide multiple virtual adapters to the given system image using a single fibre channel adapter.

7. A data processing system, comprising a multi-processor data processing system server having a plurality of processors, said data processing system further comprising:

a fibre channel adapter comprising a processor port, a plurality of fibre channel device ports operable for concurrently communicating data with a plurality of different fiber channel devices by the fibre channel adapter and a plurality of queues, wherein one of the plurality of queues is accessible by one of the plurality of processors and another of the plurality of queues is accessible by another of the plurality of processors;

a first device coupled to one of the fibre channel device ports and a second device couple to another of the fibre channel device ports, wherein a first processor of the plurality of processors accesses the first device using at least one first queue of the plurality of queues while another processor of the plurality of processors accesses the second device using at least one second queue of the plurality of queues; and a supervisor system, separate from the plurality of processor, that (1) configures the plurality of queues of the fibre channel adapter to enable access to the plurality of queues by the plurality of processors, and (2) enforces local partitioning of the plurality of processors by prohibiting one processor from accessing memory of the main memory that is associated with another processor of the plurality of processors, wherein one processor of the plurality of processors is a hosting processor that configures the plurality of queues of the fibre channel adapter as specified by the supervisor system.

8. The system of claim 7, wherein the supervisor system (1) stores configuration changes made to the fibre channel adapter in a supervisor memory of the supervisor system and (2) sends the configuration changes to the hosting processor.

* * * * *